US010970698B1

(12) United States Patent
Binder et al.

(10) Patent No.: US 10,970,698 B1
(45) Date of Patent: Apr. 6, 2021

(54) READER DETECTION SIGNAL BYPASSING SECURE PROCESSOR

(71) Applicant: Square, Inc., San Francisco, CA (US)

(72) Inventors: Jason Binder, San Francisco, CA (US); Matthew Maibach, San Francisco, CA (US); Cory Douthat, San Francisco, CA (US); Thomas Byrne, Oakland, CA (US)

(73) Assignee: Square, Inc., San Francisco, CA (US)

( * ) Notice: Subject to any disclaimer, the term of this patent is extended or adjusted under 35 U.S.C. 154(b) by 334 days.

(21) Appl. No.: 15/836,753

(22) Filed: Dec. 8, 2017

(51) Int. Cl.
| G06Q 20/20 | (2012.01) |
| G06Q 20/32 | (2012.01) |
| H04B 5/00 | (2006.01) |
| G07G 1/01 | (2006.01) |
| G07G 1/00 | (2006.01) |

(52) U.S. Cl.
CPC ....... *G06Q 20/206* (2013.01); *G06Q 20/3278* (2013.01); *G07G 1/0018* (2013.01); *G07G 1/0045* (2013.01); *G07G 1/01* (2013.01); *H04B 5/0087* (2013.01)

(58) Field of Classification Search
CPC ............. G06Q 20/206; G06Q 20/3278; G07G 1/0018; G07G 1/0045; G07G 1/01; H04B 5/0087
See application file for complete search history.

(56) References Cited

U.S. PATENT DOCUMENTS 3,128,349 A * 4/1964 Nash ............... H04Q 1/453
340/13.34
4,758,714 A * 7/1988 Carlson ............ G06K 17/00
235/380

(Continued)

FOREIGN PATENT DOCUMENTS

| AU | 2324402 A | 6/2002 |
| DE | 20320080 U1 | 4/2004 |

(Continued)

OTHER PUBLICATIONS

Non-Final Office Action dated Jul. 25, 2019, for U.S. Appl. No. 15/599,826, of Dorsey, J., et al., filed May 19, 2017.

(Continued)

*Primary Examiner* — Peter Ludwig
*Assistant Examiner* — Michael Jared Walker
(74) *Attorney, Agent, or Firm* — Polsinelli, P.C.

(57) ABSTRACT

A transaction object reader receives a signal from a user's transaction object when the user's transaction object is in proximity with the transaction object reader. This signal is conveyed from the transaction object reader to a secure processor that reads transaction information from the signal, generates a processed dataset by encrypting or otherwise processing the transaction information, and outputs the processed dataset to a main processor, which uses the processed dataset to conduct a transaction. The signal from the transaction object reader is also conveyed along a second path that bypasses the secure processor, instead going to a (Continued)

filter that filters the signal to attenuate the transaction information and then going to the main processor, which uses the filtered signal to provide feedback to the user identifying how close the transaction object is to the transaction object reader.

20 Claims, 12 Drawing Sheets

(56) References Cited

U.S. PATENT DOCUMENTS

| | | | | |
|---|---|---|---|---|
| 4,776,003 A * | 10/1988 | Harris | | G06Q 20/363 |
| | | | | 455/407 |
| 4,860,336 A * | 8/1989 | D'Avello | | G06Q 20/322 |
| | | | | 455/558 |
| 5,221,838 A * | 6/1993 | Gutman | | G06Q 20/32 |
| | | | | 235/379 |
| 5,351,296 A * | 9/1994 | Sullivan | | G06Q 20/108 |
| | | | | 379/413 |
| 5,388,155 A * | 2/1995 | Smith | | H04B 1/385 |
| | | | | 379/426 |
| 5,408,513 A * | 4/1995 | Busch, Jr. | | G06Q 20/32 |
| | | | | 379/114.19 |
| 5,714,741 A * | 2/1998 | Pieterse | | G06Q 20/327 |
| | | | | 235/380 |
| 5,729,591 A * | 3/1998 | Bailey | | G06Q 20/32 |
| | | | | 379/91.01 |
| 5,740,232 A * | 4/1998 | Pailles | | G06Q 20/363 |
| | | | | 379/93.02 |
| 5,752,046 A * | 5/1998 | Oprescu | | G06F 1/26 |
| | | | | 713/300 |
| 5,838,773 A * | 11/1998 | Eisner | | G06Q 20/02 |
| | | | | 379/91.01 |
| 5,850,599 A * | 12/1998 | Seiderman | | G06Q 20/04 |
| | | | | 455/406 |
| 5,867,795 A * | 2/1999 | Novis | | G06Q 20/3226 |
| | | | | 455/558 |
| 5,940,510 A * | 8/1999 | Curry | | G06Q 20/10 |
| | | | | 705/65 |
| 6,010,067 A * | 1/2000 | Elbaum | | G06Q 20/32 |
| | | | | 235/380 |
| 6,065,679 A | 5/2000 | Levie et al. | | |
| 6,098,881 A * | 8/2000 | DeLand, Jr. | | G06K 7/087 |
| | | | | 235/380 |
| 6,144,336 A * | 11/2000 | Preston | | G01S 5/0027 |
| | | | | 342/357.37 |
| 6,234,389 B1 * | 5/2001 | Valliani | | G06Q 20/20 |
| | | | | 235/379 |
| 6,278,779 B1 * | 8/2001 | Bryant | | H04M 1/04 |
| | | | | 379/446 |
| 6,481,623 B1 * | 11/2002 | Grant | | G06K 7/084 |
| | | | | 235/380 |
| 6,600,823 B1 | 7/2003 | Hayosh | | |
| 6,886,742 B2 * | 5/2005 | Stoutenburg | | G06Q 20/04 |
| | | | | 235/379 |
| 6,990,683 B2 * | 1/2006 | Itabashi | | G06Q 20/20 |
| | | | | 726/9 |
| 7,003,316 B1 * | 2/2006 | Elias | | G06Q 20/20 |
| | | | | 455/11.1 |
| 7,066,382 B2 * | 6/2006 | Kaplan | | G06F 21/34 |
| | | | | 235/375 |
| 7,083,090 B2 * | 8/2006 | Zuili | | G06Q 20/341 |
| | | | | 235/382 |
| 7,124,937 B2 * | 10/2006 | Myers | | G06Q 20/10 |
| | | | | 235/380 |
| 7,163,148 B2 * | 1/2007 | Durbin | | G06K 7/084 |
| | | | | 235/449 |
| 7,210,627 B2 * | 5/2007 | Morley, Jr. | | G06K 7/084 |
| | | | | 235/449 |
| 7,363,054 B2 | 4/2008 | Elias et al. | | |
| 7,424,732 B2 * | 9/2008 | Matsumoto | | G06Q 20/02 |
| | | | | 726/2 |
| 7,433,452 B2 * | 10/2008 | Taylor | | G06Q 20/04 |
| | | | | 379/93.12 |
| 7,506,956 B2 * | 3/2009 | Usui | | B41J 2/165 |
| | | | | 347/23 |
| 7,591,425 B1 | 9/2009 | Zuili et al. | | |
| 7,673,799 B2 * | 3/2010 | Hart | | G07F 7/0813 |
| | | | | 235/449 |
| 7,810,729 B2 * | 10/2010 | Morley, Jr. | | G06K 7/083 |
| | | | | 235/435 |
| 7,896,248 B2 * | 3/2011 | Morley, Jr. | | G06K 7/083 |
| 8,086,531 B2 * | 12/2011 | Litster | | G06Q 20/102 |
| | | | | 705/40 |
| 8,126,734 B2 * | 2/2012 | Dicks | | G06Q 50/24 |
| | | | | 705/2 |
| 8,265,553 B2 * | 9/2012 | Cheon | | H04M 1/72527 |
| | | | | 361/679.4 |
| 8,355,003 B2 * | 1/2013 | Pope | | A63F 13/06 |
| | | | | 345/170 |
| 8,397,988 B1 * | 3/2013 | Zuili | | G06Q 20/341 |
| | | | | 235/383 |
| 8,553,055 B1 * | 10/2013 | Martell | | B41J 29/13 |
| | | | | 347/192 |
| 9,020,853 B2 * | 4/2015 | Hoffman | | G06Q 20/04 |
| | | | | 705/41 |
| 9,092,766 B1 * | 7/2015 | Bedier | | G06Q 20/4016 |
| 9,223,376 B2 * | 12/2015 | Derbyshire | | G06F 1/3212 |
| 9,344,281 B2 | 5/2016 | Kobres et al. | | |
| 9,355,277 B2 | 5/2016 | Kobres et al. | | |
| 9,396,368 B1 * | 7/2016 | Lamba | | G06K 7/10148 |
| 9,489,703 B2 * | 11/2016 | Kauniskangas | | G16H 40/63 |
| 9,529,758 B1 * | 12/2016 | Szeto | | G06F 13/4022 |
| 9,590,747 B2 | 3/2017 | Thoukydides et al. | | |
| 9,607,181 B2 | 3/2017 | Matsumoto et al. | | |
| 9,659,441 B2 * | 5/2017 | Kelly | | A63F 13/00 |
| 9,679,286 B2 | 6/2017 | Colnot et al. | | |
| 9,824,350 B2 | 11/2017 | Dorsey et al. | | |
| 10,140,604 B1 | 11/2018 | Douthat et al. | | |
| 10,182,328 B1 * | 1/2019 | Maibach | | H04W 52/0225 |
| 10,733,589 B2 | 8/2020 | Douthat et al. | | |
| 2002/0091633 A1 * | 7/2002 | Proctor | | G07F 7/088 |
| | | | | 705/39 |
| 2002/0153414 A1 * | 10/2002 | Stoutenburg | | G06Q 30/06 |
| | | | | 235/380 |
| 2003/0135418 A1 * | 7/2003 | Shekhar | | G06Q 20/20 |
| | | | | 705/16 |
| 2003/0154414 A1 * | 8/2003 | von Mueller | | G06F 1/1632 |
| | | | | 713/300 |
| 2003/0183691 A1 * | 10/2003 | Lahteenmaki | | G06Q 20/327 |
| | | | | 235/441 |
| 2003/0200108 A1 * | 10/2003 | Malnoe | | B67D 7/246 |
| | | | | 705/16 |
| 2004/0012875 A1 * | 1/2004 | Wood | | G06K 7/084 |
| | | | | 360/55 |
| 2004/0041911 A1 * | 3/2004 | Odagiri | | H04N 5/232 |
| | | | | 348/207.1 |
| 2004/0059682 A1 * | 3/2004 | Hasumi | | G06Q 20/385 |
| | | | | 705/64 |
| 2004/0088449 A1 * | 5/2004 | Sakaki | | G06F 13/385 |
| | | | | 710/15 |
| 2004/0167820 A1 * | 8/2004 | Melick | | G06Q 20/32 |
| | | | | 705/16 |
| 2004/0204082 A1 * | 10/2004 | Abeyta | | G06Q 20/341 |
| | | | | 455/557 |
| 2004/0251908 A1 | 12/2004 | Knopf | | |
| 2005/0097015 A1 * | 5/2005 | Wilkes | | G06Q 40/12 |
| | | | | 705/30 |
| 2005/0109841 A1 * | 5/2005 | Ryan | | G06Q 20/10 |
| | | | | 235/380 |
| 2005/0179956 A1 | 8/2005 | Silverbrooks et al. | | |
| 2005/0236480 A1 * | 10/2005 | Vrotsos | | G07F 7/1008 |
| | | | | 235/439 |
| 2006/0032905 A1 * | 2/2006 | Bear | | H04M 1/2478 |
| | | | | 235/380 |
| 2006/0049255 A1 * | 3/2006 | von Mueller | | G06F 21/72 |
| | | | | 235/449 |
| 2006/0049256 A1 * | 3/2006 | von Mueller | | G06Q 20/40975 |
| | | | | 235/449 |

(56) References Cited

U.S. PATENT DOCUMENTS

| | | | |
|---|---|---|---|
| 2006/0056401 A1* | 3/2006 | Bohm | G06F 13/4022 370/360 |
| 2006/0223580 A1* | 10/2006 | Antonio | H04M 1/6058 455/557 |
| 2007/0067833 A1* | 3/2007 | Colnot | H04L 63/10 726/9 |
| 2007/0168300 A1* | 7/2007 | Quesselaire | G06Q 20/347 705/79 |
| 2007/0194104 A1* | 8/2007 | Fukuda | G07F 7/02 235/379 |
| 2007/0198436 A1* | 8/2007 | Weiss | H04L 9/0891 705/75 |
| 2008/0091617 A1* | 4/2008 | Hazel | G06Q 20/085 705/73 |
| 2008/0104631 A1 | 5/2008 | Krock et al. | |
| 2008/0148394 A1 | 6/2008 | Poidomani et al. | |
| 2008/0238687 A1* | 10/2008 | Ozer | G06K 7/10316 340/572.7 |
| 2009/0070583 A1 | 3/2009 | von Mueller et al. | |
| 2009/0112768 A1* | 4/2009 | Hammad | G06Q 20/20 705/44 |
| 2009/0164326 A1* | 6/2009 | Bishop | G06Q 20/403 705/19 |
| 2009/0271270 A1* | 10/2009 | Regmi | G06Q 30/0277 705/14.56 |
| 2009/0317161 A1 | 12/2009 | Vo et al. | |
| 2010/0057620 A1* | 3/2010 | Li | G06Q 20/202 705/71 |
| 2010/0220136 A1 | 9/2010 | Sheahan et al. | |
| 2010/0243732 A1* | 9/2010 | Wallner | G06Q 20/00 235/380 |
| 2011/0078034 A1 | 3/2011 | Hayhow | |
| 2012/0039469 A1* | 2/2012 | Mueller | G06Q 20/12 380/252 |
| 2012/0060041 A1* | 3/2012 | Hashimoto | G06F 3/1221 713/310 |
| 2012/0203620 A1* | 8/2012 | Dobyns | H04B 5/0075 705/14.38 |
| 2013/0013515 A1 | 1/2013 | Walters et al. | |
| 2013/0079037 A1* | 3/2013 | Dobyns | H04W 4/80 455/456.3 |
| 2013/0094668 A1* | 4/2013 | Poulsen | H03G 11/002 381/107 |
| 2013/0262708 A1* | 10/2013 | McLeod | G06F 13/4252 710/2 |
| 2014/0021254 A1* | 1/2014 | Marshall | G06K 7/01 235/435 |
| 2014/0127995 A1* | 5/2014 | Hendricksen | G06K 7/10148 455/41.1 |
| 2014/0191913 A1* | 7/2014 | Ge | H01Q 1/2258 343/720 |
| 2014/0206339 A1* | 7/2014 | Lindoff | H04W 4/025 455/419 |
| 2014/0249942 A1* | 9/2014 | Hicks | G06Q 20/20 705/17 |
| 2014/0295777 A1* | 10/2014 | Wang | H03H 7/38 455/75 |
| 2014/0368339 A1* | 12/2014 | Thaker | G08B 21/24 340/539.32 |
| 2015/0118970 A1* | 4/2015 | Thoukydides | H04B 17/21 455/67.14 |
| 2015/0199882 A1* | 7/2015 | Fernando | G06F 1/1696 345/173 |
| 2015/0227485 A1* | 8/2015 | Maung | G06F 13/4022 710/316 |
| 2015/0269805 A1* | 9/2015 | Korala | G07F 7/1033 713/194 |
| 2016/0014623 A1* | 1/2016 | Tanner | H04W 4/50 455/41.1 |
| 2016/0117662 A1 | 4/2016 | Bedier et al. | |
| 2016/0125376 A1* | 5/2016 | Beatty | G07G 1/0009 705/72 |
| 2016/0211843 A1* | 7/2016 | Wang | H03K 19/003 |
| 2016/0275478 A1 | 9/2016 | Li et al. | |
| 2016/0307010 A1* | 10/2016 | Ge | G06F 16/955 |
| 2016/0307171 A1* | 10/2016 | Haga | G06Q 20/202 |
| 2017/0004485 A1* | 1/2017 | Lee | G06Q 20/3226 |
| 2017/0017943 A1* | 1/2017 | Bilhan | G06Q 20/206 |
| 2017/0160819 A1* | 6/2017 | Yi | H04W 12/0608 |
| 2017/0220822 A1 | 8/2017 | Kobres et al. | |
| 2017/0255927 A1* | 9/2017 | Dorsey | G06Q 40/02 |
| 2017/0309137 A1* | 10/2017 | Shah | G06Q 20/3278 |
| 2017/0337403 A1* | 11/2017 | Ohno | G06K 7/10316 |
| 2018/0026373 A1* | 1/2018 | Schwent | H01Q 21/28 343/748 |
| 2018/0314661 A1* | 11/2018 | Douthat | G06F 13/4282 |
| 2018/0316815 A1* | 11/2018 | Douthat | H04N 1/00899 |
| 2020/0334657 A1 | 10/2020 | Douthat et al. | |

FOREIGN PATENT DOCUMENTS

| | | |
|---|---|---|
| DE | 201 22 899 U1 | 9/2009 |
| EP | 0 895 203 A2 | 2/1999 |
| EP | 1205895 A2 | 5/2002 |
| EP | 1 874 014 A2 | 1/2008 |
| EP | 2 965 167 A1 | 1/2016 |
| FR | 2 812 744 A1 | 2/2002 |
| FR | 2 812 745 A1 | 2/2002 |
| FR | 2 834 156 A1 | 6/2003 |
| JP | H09231285 A | 9/1997 |
| JP | 2000-030146 A | 1/2000 |
| JP | 2000-071580 A | 3/2000 |
| JP | 2000-276539 A | 10/2000 |
| JP | 2001-222595 A | 8/2001 |
| JP | 2002-074507 A | 3/2002 |
| JP | 2002-123771 A | 4/2002 |
| JP | 2002-137506 A | 5/2002 |
| JP | 2002-279320 A | 9/2002 |
| JP | 2002-352166 A | 12/2002 |
| JP | 2002-358285 A | 12/2002 |
| JP | 2003-108777 A | 4/2003 |
| JP | 2003-281453 A | 10/2003 |
| JP | 2003-308438 A | 10/2003 |
| JP | 2003-316558 A | 11/2003 |
| JP | 2004-054651 A | 2/2004 |
| JP | 2004-062733 A | 2/2004 |
| JP | 2004-078553 A | 3/2004 |
| JP | 2004-078662 A | 3/2004 |
| JP | 2004-199405 A | 7/2004 |
| JP | 2004-351899 A | 12/2004 |
| JP | 4248820 B2 | 4/2009 |
| JP | 2013-086448 A | 5/2013 |
| JP | 2015-170356 A | 9/2015 |
| JP | 2016-514442 A | 5/2016 |
| JP | 2017-056698 A | 3/2017 |
| KR | 10-1999-0066397 A | 8/1999 |
| KR | 10-1999-0068618 A | 9/1999 |
| KR | 200225019 B1 | 3/2001 |
| KR | 10-2003-0005936 A | 1/2003 |
| KR | 10-2003-0005984 A | 1/2003 |
| KR | 10-2003-0012910 A | 2/2003 |
| KR | 200333809 B1 | 11/2003 |
| KR | 10-2004-0016548 A | 2/2004 |
| KR | 100447431 B1 | 8/2004 |
| KR | 200405877 B1 | 1/2006 |
| KR | 100649151 B1 | 11/2006 |
| KR | 10-2007-0107990 A | 11/2007 |
| KR | 100842484 B1 | 6/2008 |
| RU | 2284578 C1 | 9/2006 |
| WO | 1998/012674 A2 | 3/1998 |
| WO | 2000/011624 A1 | 3/2000 |
| WO | 2000/025277 A1 | 5/2000 |
| WO | 2001/086599 A2 | 11/2001 |
| WO | 2002/033669 A1 | 4/2002 |
| WO | 2002/043202 A2 | 5/2002 |
| WO | 2002/082388 A1 | 10/2002 |
| WO | 2002/084548 A1 | 10/2002 |
| WO | 2003/044710 A1 | 5/2003 |
| WO | 2003/079259 A1 | 9/2003 |
| WO | 2004/023366 A1 | 3/2004 |

(56) References Cited

FOREIGN PATENT DOCUMENTS

| WO | 2006/131708 A1 | 12/2006 |
|---|---|---|
| WO | 2018/200730 A1 | 11/2018 |
| WO | 2018/200732 A1 | 11/2018 |

OTHER PUBLICATIONS

Non-Final Office Action dated Oct. 1, 2019, for U.S. Appl. No. 15/582,166, of Douthat, C., et al., 'filed Apr. 28, 2017.
Notice of Allowance dated Jul. 18, 2018, for U.S. Appl. No. 15/597,035, of Douthat, C., et al., filed May 16, 2017.
Notice of Allowance dated Sep. 6, 2018, for U.S. Appl. No. 15/620,642, of Maibach, M.H., et al., filed Jun. 12, 2017.
Non-Final Office Action dated Sep. 7, 2018, for U.S. Appl. No. 15/582,174, of Douthat, C., et al., filed Apr. 28, 2017.
International Search Report and Written Opinion for International Application No. PCT/US2018/029449, dated Jul. 31, 2018.
Notice of Allowance dated Oct. 24, 2019, for U.S. Appl. No. 15/582,174, of Douthat, C., et al., filed Apr. 28, 2017.
Notice of Allowance dated Jan. 27, 2020, for U.S. Appl. No. 15/599,826, of Dorsey, J., et al., filed May 19, 2017.
Non-Final Office Action dated Jan. 27, 2020, for U.S. Appl. No. 15/836,713, of Douthat, C., et al., filed Dec. 8, 2017.
Non-Final Office Action dated Jul. 28, 2017, for U.S. Appl. No. 15/597,035, of Douthat, C., et al., filed May 16, 2017.
Final Office Action dated Jan. 12, 2018, for U.S. Appl. No. 15/597,035, of Douthat, C., et al., filed May 16, 2017.
Non-Final Office Action dated Apr. 16, 2018, for U.S. Appl. No. 15/620,642, of Maibach, M.H., et al., filed Jun. 12, 2017.
Final office Action dated Mar. 11, 2019, for U.S. Appl. No. 15/582,174, of Douthat, C., et al., filed Apr. 28, 2017.
International Search Report and Written Opinion for International Application No. PCT/US2018/029451, dated Sep. 17, 2018.
"Connection of Terminal Equipment to the Telephone Network," FCC 47 CFR Part 68, Retrieved from the URL: http://www.tscm.com/FCC47CFRpart68.pdf, on Sep. 24, 2019 Oct. 1, 1999 Edition.
"Embedded FINancial transactional IC card READer," Retrieved from the URL: https://cordis.europa.eu/project/rcn/58338/factsheet/en.
Geethapriya Venkataramani and Srividya Gopalan., "Mobile phone based RFID architecture for secure electronic payments using RFID credit cards," 2007 IEEE, (ARES'07).
"Guideline for the Use of Advanced Authentication Technology," FIPS 190, Sep. 28, 1994.
"Identification cards—Recording technique—Part 4—Location of read-only magnetic tracks—Track 1 and 2," ISO/IEC 7811-4:1995, International Organization for Standardization, Aug. 1995.
Jerome Svigals., "The Long Life and Imminent Death of the Mag-stripe Card," IEEE Spectrum, vol. 49, Issue 61, Jun. 2012.
"Magensa's Decryption Services and MagTek's MagneSafe™ Bluetooth Readers Selected by eProcessing Network to Implement Secure Customer Card Data with Mobile Devices," Retrieved from the URL: https://www.magnensa.net/aboutus/articles/eProcessing - rev1.pdf Apr. 14, 2008.
Martha E. Haykin et al., "Smart Card Technology: New Methods for Computer Access Control," NIST Special Publication 500-157, Sep. 1988.
"MSP430x1xx Family User's Guide," (including 2016 correction sheet at 2), Texas Instruments Inc., 2006.
Spegele, Joseph Brain., "A Framework for Evaluating Application of Smart Cards and Related Technology Within the Department of Defense," Naval Postgraduate School, Jan. 1995.
Stephen A. Sherman et al., "Secure Network Access Using Multiple Applications of AT&T's Smart Card," AT&T Technical Journal, Sep./Oct. 1994.
Notice of Allowance dated Mar. 25, 2020, for U.S. Appl. No. 15/582,166, of Douthat, C., et al., filed Apr. 28, 2017.
European Office Action for European Patent Application No. 18742856.0 dated Feb. 18, 2020.
Intention to Grant European Patent Application No. 18724079.1 dated May 20, 2020.
Final Office Action dated Aug. 21, 2020, for U.S. Appl. No. 15/836,713, of Douthat, C., et al., filed Dec. 8, 2017.
English Language Translation of Notice of Reason for Refusal for Japanese Patent Application No. 2019-554368 dated Nov. 20, 2020.
Office Action for European Patent Application No. 18724079.1 dated Sep. 29, 2020.
Examiner Requisition for Canadian Patent Application No. 3059245, dated Nov. 12, 2020.

* cited by examiner

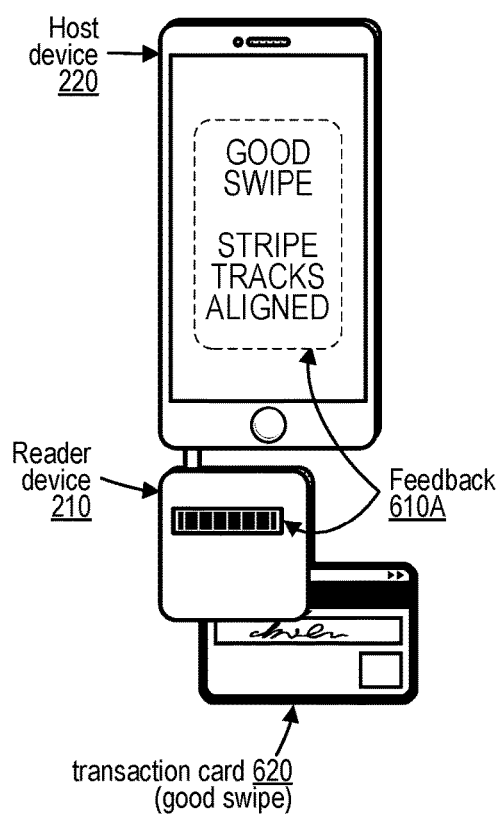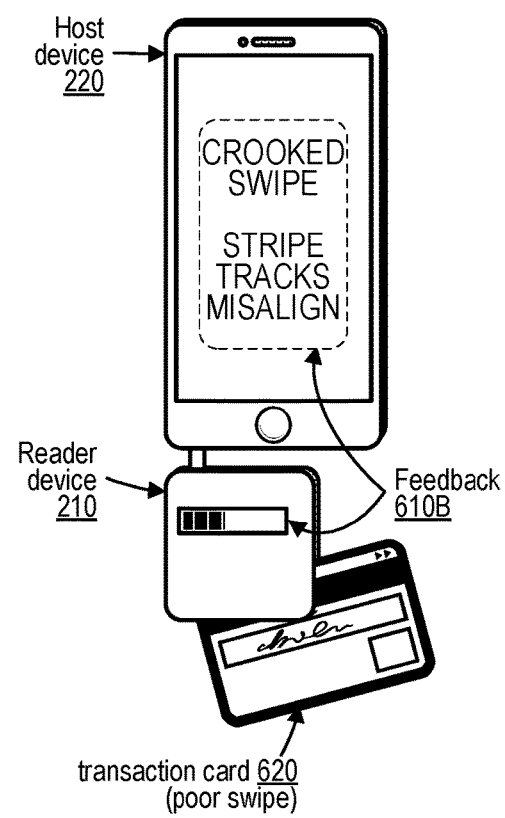

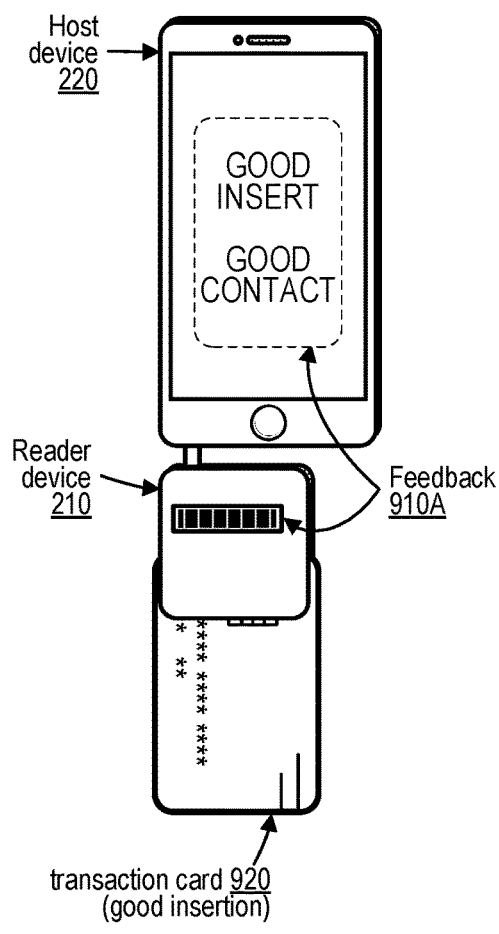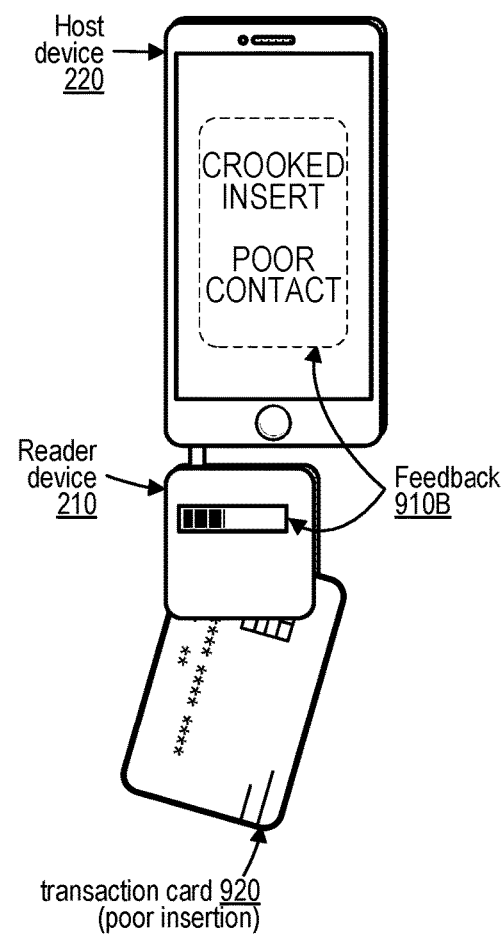

READER DETECTION SIGNAL BYPASSING SECURE PROCESSOR

BACKGROUND

Transaction object reading devices are devices that read information from transaction objects, such as credit cards or wireless near field communication (NFC) devices. Transaction object reading devices typically include circuitry that reads, stores, and conveys sensitive information such as a customer's credit card number or personal identification number ("PIN"). If such circuitry of the transaction object reader is left unprotected, a malicious party could potentially retrieve a customer's sensitive information by accessing the circuitry of the transaction object reader that reads, stores, or conveys the sensitive information.

Some transaction object reading devices include security precautions to prevent malicious parties from retrieving a customer's sensitive information, for example by encrypting the customer's sensitive information as quickly as possible upon receiving it. However, encryption takes some time, particularly with smaller low-power processors intended for portable devices, and any processor performing encryption or memory storing a cryptographic key both need to be protected against malicious parties as well, further slowing down this path.

Transactions using NFC-based readers and NFC-capable devices such as smartphones are still uncommon in many countries. Users who are relatively unfamiliar with the process or with the reader hardware are sometimes unsure where to tap or place their NFC-capable device. Typical NFC-based readers will only notify the user once a payment is complete, which can take a while given the various security precautions built into many transaction object reading devices. In the meantime, users must often resort to tapping their NFC-capable devices on different areas of the NFC-based reader hoping that one of the areas will work, often not stopping at any one areas long enough for the NFC-based reader to actually successfully read the transaction information and conduct the transaction.

An output device is a component that produces an output that may be visual, audio, or tactile. Examples of output devices include display screens, light bulbs, speakers, and vibration actuators.

There is a need in the art for bypassing security transaction object reading device.

BRIEF DESCRIPTION OF THE DRAWINGS

FIG. 6A illustrates visual card-sliding feedback on both a display screen and a meter interface of a dual-unit point of sale (POS) system where a magstripe card is slid properly.

FIG. 6B illustrates visual card-sliding feedback on both a display screen and a meter interface of a dual-unit point of sale (POS) system where a magstripe card is slid crookedly.

FIG. 9A illustrates visual card-insertion feedback on both a display screen and a meter interface of a dual-unit point of sale (POS) system where a chip card is inserted properly.

FIG. 9B illustrates visual card-insertion feedback on both a display screen and a meter interface of a dual-unit point of sale (POS) system where a chip card is inserted crookedly.

DETAILED DESCRIPTION

A transaction object reader receives a signal from a user's transaction object when the user's transaction object is in proximity with the transaction object reader. This signal is conveyed from the transaction object reader to a secure processor that reads transaction information from the signal, generates a processed dataset by encrypting or otherwise processing the transaction information, and outputs the processed dataset to a main processor, which uses the processed dataset to conduct a transaction. The signal from the transaction object reader is also conveyed along a second path that bypasses the secure processor, instead going to a filter that filters the signal to attenuate the transaction information and then going to the main processor, which uses the filtered signal to provide feedback to the user identifying how close the transaction object is to the transaction object reader.

Figure 1:
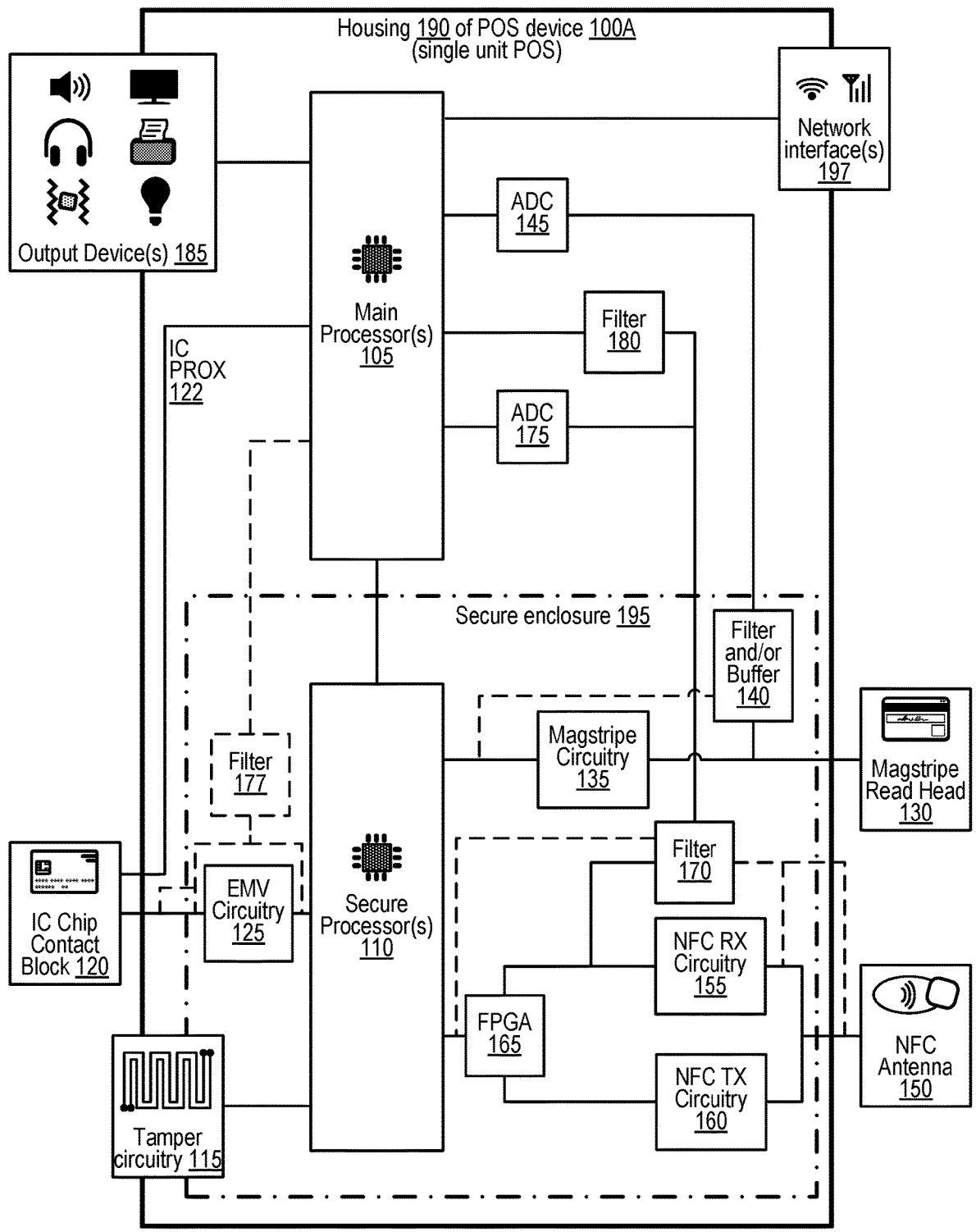
FIG. 1 is a block diagram illustrating a single-unit point of sale (POS) device with a main processor, a secure processor, and transaction object reader interfaces that both connect to the secure processor and bypass the secure processor when it is advantageous to quickly notify the main processor of a transaction object in the proximity.

FIG. 1 is a block diagram illustrating a single-unit point of sale (POS) device with a main processor, a secure processor, and transaction object reader interfaces that both connect to the secure processor and bypass the secure processor when it is advantageous to quickly notify the main processor of a transaction object in the proximity.

The POS device 100A of FIG. 1 is referred to as a "single-unit" POS system because the main processor 105, secure processor 110, output device 185, and transaction object reader interfaces 120/130/150 are all in a single POS device 100A with a single housing 190. In contrast, FIG. 2 illustrates a "dual-unit" POS system 100B in which a host device 220 has the main processor 105 while a separate reader device 210 has the secure processor 110 and the transaction object reader interfaces 120/130/150.

The terms "main processor 105" and "secure processor 110" as used herein each include a set of one or more of any type of processor(s), controller(s), microcontroller(s), application specific integrated circuit(s) (ASIC), field-programmable gate array(s) (FPGA), or combinations thereof. The "main processor 105" and "secure processor 110" may include any circuit board component illustrated or discussed with respect to the "processor(s)/controller(s) 810" or any of the rest of the circuit board components 800 illustrated or discussed with respect to FIG. 8. The main processor 105 and/or secure processor 110 may run one or more operating systems such as Google® Android®, Apple® iOS®, Microsoft® Windows®, Google® Chrome OS®, Apple® MacOS®, Microsoft® Windows Phone OS®, a distribution of Linux®, or some combination thereof. The "main" processor 105 and "secure" processor 110 can alternately be referred to as the "first" processor 105 and the "second" processor 110 respectively, or vice versa.

Figure 2:
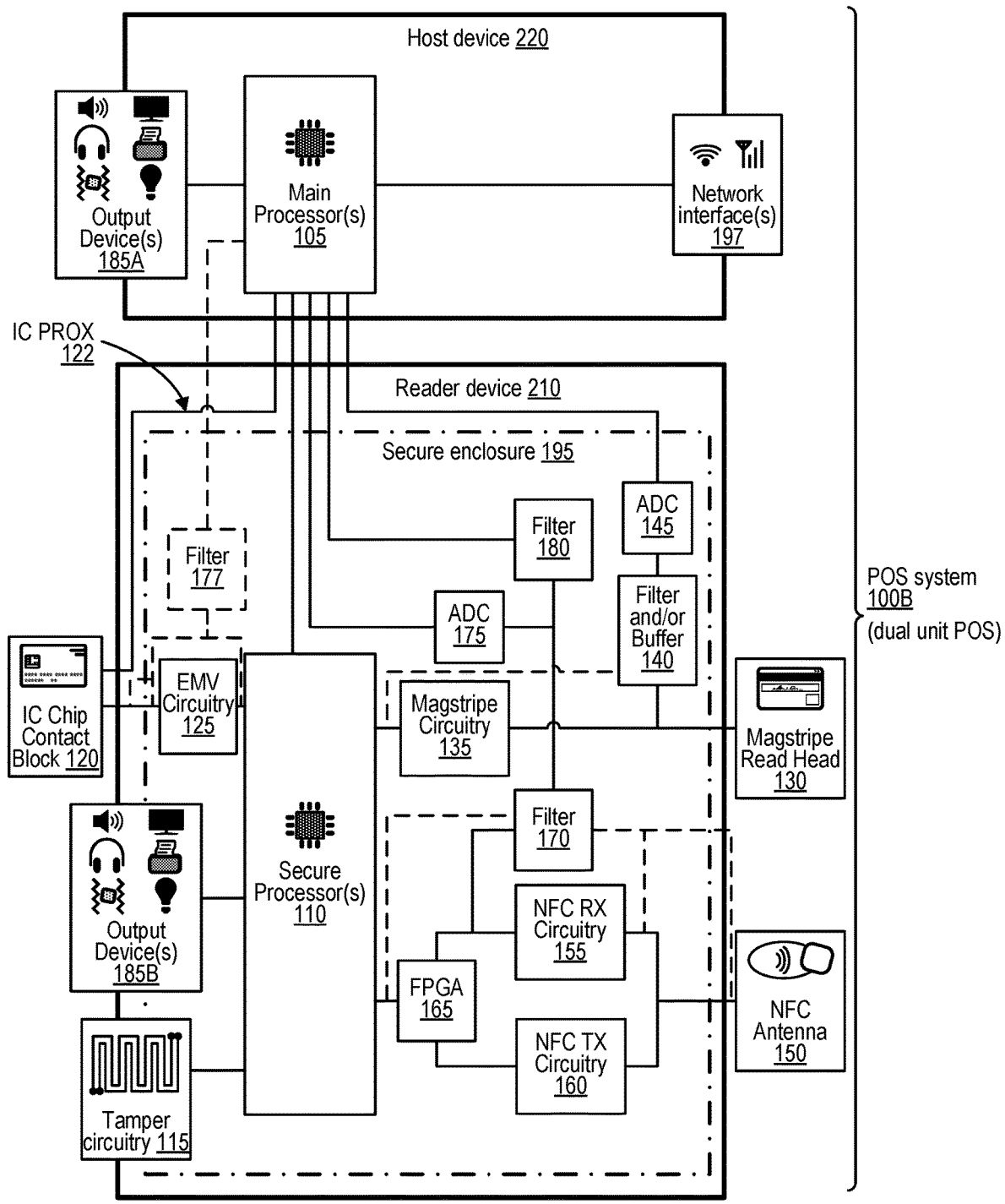
FIG. 2 is a block diagram illustrating a dual-unit point of sale (POS) system with a main processor, a secure processor, and transaction object reader interfaces that both connect to the secure processor and bypass the secure processor when it is advantageous to quickly notify the main processor of a transaction object in the proximity.

The secure processor 110 of FIG. 1 and FIG. 2 is tasked with retrieval, handling, and processing of sensitive information. For example, the secure processor 110 receives transaction information from transaction object reader interfaces 120/130/150 and/or transaction object reader circuitry 870 as illustrated and discussed with respect to FIG. 8. The secure processor 110 generates a processed dataset by encrypting, password-protecting, or otherwise processing this transaction information. The secure processor 110 then sends this processed dataset to the main processor 105. The main processor 105 can then send the processed dataset it receives from the secure processor 110 to an appropriate server via the network interface(s) 197 to complete the transaction, the type of server depending on the type of transaction object as discussed with respect to transaction object reader circuitry 870 as illustrated and discussed with respect to FIG. 8. The secure processor 110 of FIG. 1 and FIG. 2 is prevented from directly accessing the network interface(s) 197 to help maintain its secure nature, though in some cases, limited direct access, such as one-way transmit-only access, is possible while still maintaining security.

The transaction object reader interfaces of FIG. 1 and FIG. 2 include an integrated circuit (IC) chip reader interface for reading transaction cards with IC chips, such as smart cards or a credit cards IC chips following Europay/Mastercard/Visa (EMV) standards. When a user inserts a transaction card with an IC chip into an IC chip slot of the POS device 100, conductive contacts of an IC chip contact block 120 within the IC chip slot touch the conductive contacts of the IC chip on the card to form a circuit and read transaction information from the IC chip on the card. The IC chip contact block 120 can be connected to circuitry 125 that controls the timing and format of communications between the IC of the transaction card and the IC chip contact block 120 depending on the standard being used, such as EMV. The circuitry 125 may also help format, interpret, process, or in some cases even encrypt the transaction information received from the IC chip contact block 120 before the secure processor 110 receives the transaction information. Many IC chip standards require an authentication process that requires verification data to be sent back and forth between the IC chip and an authentication server, which can be handled by the EMV circuitry 125, the secure processor 110, the main processor 105, the network interface 197, or a combination thereof.

In addition to outputting transaction information, IC chip contact block 120 may also output a IC chip proximity detection signal 122 that goes directly to the main processor 105 in FIG. 1. The IC chip proximity detection signal 122 is distinct from the transaction information output going to the EMV circuitry block 125 in FIG. 1. The IC chip proximity detection signal 122 generally conveys a Boolean status identifying whether or not the IC chip contact block 120 is detecting that there is a transaction card currently in the IC card slot. This proximity detection may be achieved with a physical switch or button within the slot that is opened or closed by the pressure of the transaction card moving into the slot. This alternately or additionally may be achieved with a second set of conductive contacts that detects the IC chip of the card before the IC chip reaches the reader contacts that read from the IC chip. In either case, the proximity detection signal 122 is generally sent by the IC chip contact block 120 before the IC chip contact block 120 has finished reading the IC chip, or in some cases before the IC chip contact block 120 even begins reading the IC chip.

The IC proximity detection signal 122 is generally received by the main processor 105 before the main processor 105 receives from the secure processor 110 the processed dataset corresponding to the IC transaction information. The IC proximity detection signal 122 effectively allows the main processor 105 to perform a few tasks before they are needed to speed up operation of the POS system 100 during a transaction. For example, the main processor 105 can, in response to receipt of the IC proximity detection signal 122, wake itself up from a low-power or "sleep" state into a higher-power state, turn on or wake up a receipt printer, turn on or wake up the network interfaces 197, cache subroutines or information necessary to conduct an IC chip transaction in memory, or a combination thereof. The IC proximity detect signal 122 can wake up the main processor 105 itself if it feeds into one or more general purpose input/output (GPIO) pins, for example including an inter-integrated circuit (I2C) pin. Generation and sending of the IC proximity detection signal 122 directly to the main processor 105 and bypassing the secure processor 110 ultimately produces the technical benefit and effect of speeding up operation of the POS system 100 and making transaction processing more efficient while maintaining security.

The IC proximity detection signal 122 can also be used by the main processor 105 to give useful feedback to the user. For instance, if the main processor 105 has received the IC proximity detection signal 122 but does not receive the corresponding processed dataset from the secure processor 110 after a predetermined threshold amount of time has passed, the main processor 105 can assume that the IC chip transaction card was inserted upside-down, the IC chip transaction card was inserted backwards, the IC chip transaction card was not fully inserted into the slot, the IC chip transaction card was inserted too far past the slot and contacts, the IC chip of the IC chip transaction card is malfunctioning or broken, the transaction card is missing an IC chip and is therefore not an IC chip transaction card, the IC chip reader interface is malfunctioning or broken, or a combination thereof. The main processor 105 can then indicate to the user via an output device 185 that the user should check their card and try again, or, if the IC chip reader interface has failed over a predetermine threshold number of times in a row, that the IC chip reader interface is likely broken and to switch to another payment method. In this situation, the main processor 105 can also send repair, replacement, or debugging requests via the network interface 197 to a vendor, distributor, or repair service for POS systems 100. Examples of feedback 910A and 910B given by the POS device 100 to the user is illustrated in FIGS. 9A-9B.

The transaction object reader interfaces of FIG. 1 and FIG. 2 include magnetic stripe ("magstripe") reader interface for reading magstripe transaction cards with magnetic stripes, such as classic credit cards or debit cards from before the transition to more modern IC chip transaction cards. A magstripe read head 130 reads transaction data from the magnetic stripe, generally without any additional authentication steps like the ones the IC chip transaction cards often require. Each magnetic stripe is typically divided into three parallel "tracks" that each span the length of the transaction card, each generally storing different data than the other, thereby allowing more data to be stored on the magnetic stripe as a whole. The magstripe read head 130 typically includes three reader points so that it can read all three tracks simultaneously as the card is swiped along the length of the card and of each track. The magstripe read head 130 thereby reads the transaction information from the magstripe of the magstripe transaction card and sends it to the magstripe circuitry 135, which in some cases may include a processor 710. The transaction information may be encrypted, password-protected, or otherwise processed by the magstripe circuitry 135, by the secure processor 110, or by a combination of both, thereby generating a processed dataset. The secure processor 110 then sends the processed dataset to the main processor 105, which completes the transaction by sending the processed dataset to the appropriate server via the network interface 197 as discussed above.

Traditional magstripe read heads 130 have no clear analogue to the IC proximity detection signal 122 output by the IC chip contact block 120. Including some card detection mechanism in the magstripe card slot of the POS device 100 to send a card proximity detection signal in response to detection of a card within the magstripe card slot would, however, confer some of the same benefits. Like in the IC chip contact block 120, a proximity detection of a magstripe transaction card in the magstripe card slot of the POS device 100 may be achieved with a physical switch or button within the slot that is opened or closed by the pressure of the transaction card moving into or through the slot.

A different approach is illustrated FIG. 1 and FIG. 2. In addition to the line going from the magstripe read head 130 to the secure processor 110 through the magstripe circuitry 135, an additional line is added that bypasses the secure processor 110 and goes more directly to the main processor 105 through a filter and/or buffer 140 and an ADC 145. The filter and/or buffer 140 stores information signals produced by the magstripe read head 130 while reading from the magstripe transaction card and attenuate frequencies at which the sensitive transaction information is stored, thereby outputting a filtered signal out of the secure enclosure 195. The filter 140 may be, for example, a low-pass filter or a band-pass filter. Any transaction information is substantially attenuated, reduced, or at least partially filtered out in this filtered signal, so it is safe to have it go outside of the secure enclosure 195 without fear that a malicious party would be able read the transaction information from it. The ADC 145 may be optional depending on the types of inputs that the main processor 105 is configured to receive, but it can be used to convey an indicator of card detection in the magstripe slot to the main processor 105.

The filter/buffer 140 are illustrated in FIG. 1 and FIG. 2 as branching off, via a solid line, from a path between the magstripe read head 130 and the magstripe circuitry 135. The filter/buffer 140 may alternately or additionally branch off from a path between the magstripe circuitry 135 and the secure processor 110 as suggested in FIG. 1 and FIG. 2 via a dashed line.

As with the IC proximity detection signal 122 discussed above, the filtered magstripe signal is generally received by the main processor 105 before the main processor 105 receives from the secure processor 110 the processed dataset corresponding to the magstripe transaction information. The filtered magstripe signal effectively allows the main processor 105 to perform a few tasks before they are needed to speed up operation of the POS system 100 during a transaction. For example, the main processor 105 can, in response to receipt of the filtered magstripe signal, wake itself up from a low-power or "sleep" state into a higher-power state, turn on or wake up a receipt printer, turn on or wake up the network interfaces 197, cache subroutines or information necessary to conduct a magstripe transaction in memory, or a combination thereof. The filtered magstripe signal can wake up the main processor 105 itself if it feeds into one or more general purpose input/output (GPIO) pins, for example including an inter-integrated circuit (I2C) pin. Generation and sending of the filtered magstripe signal directly to the main processor 105 and bypassing the secure processor 110 ultimately produces the technical benefit and effect of speeding up operation of the POS system 100 and making transaction processing more efficient while maintaining security.

Because the transaction information is encoded along multiple parallel "tracks" of the magnetic stripe, the filtered magstripe signal need not be Boolean like the IC proximity detection signal 122. While the filter ensures that none of the information from each track is accessible once it reaches the main processor, the filtered magstripe signal may convey if all three tracks have been "found" and thereby the magstripe transaction card is likely positioned correctly. If the filtered magstripe signal indicates that only two out of the three tracks, or one out of the three tracks, have been "found," the main processor 105 can infer that the transaction card is being swiped in a crooked fashion, the magnetic stripe of the transaction card is malfunctioning or damaged, or the magstripe read head 130 is malfunctioning or damaged. The main processor 105 can provide feedback to the user indicating that the tracks aren't all coming through and to try swiping again as illustrated in FIG. 6B as compared to the straight swipe of FIG. 6A. If no tracks at all are detected, the main processor 105 may conclude that the transaction card has likely been swiped backwards, upside down, or both, and may provide feedback to the user indicating this.

In some cases, the magstripe read head 130 and IC chip contact block 120 may be located within the same transaction card slot that can read either type of card. In this case, any combination of the proximity card detection mechanisms discussed above may be used.

The near field communication (NFC) transceiver of the POS device 100 of FIG. 1 and FIG. 2 includes an NFC antenna 150 connected to NFC receiver circuitry 155 and NFC transmitter circuitry 160, which are both connected to the secure processor, optionally with a field-programmable gate array (FPGA) 165 in between. Various functions associated with receiving and interpreting NFC signals, encoding and transmitting NFC signals, and authorization and verification may be performed at the NFC receiver circuitry 155, the NFC transmitter circuitry 160, the FPGA 165, the secure processor 110, or various combinations thereof.

Like the magstripe read head 130, there is no traditional analog to the IC proximity detection signal 122 with respect to the NFC transceiver. However, like for the magstripe read interface of FIG. 1 and FIG. 2, the POS system of FIG. 1 and FIG. 2 includes a filter 170 through which filtered information can be passed to the main processor 105. That is, in addition to the line going from the NFC antenna 150 to the secure processor 110 through the NFC receiver circuitry 155 and FPGA 165, an additional line is added that bypasses the secure processor 110 and goes more directly to the main processor 105 through a the filter 170 and optionally an ADC 175 and/or additional filter 180. The additional filter 180 may be particularly useful for debouncing in the event that the filtered NFC signal is intended to wake up the main processor 105 from a low-power state to a higher-power state via GPIO, and may be a low-pass filter or band-pass filter. The filter 170 filters information signals received via the NFC antenna 150 and its connected NFC receiver circuitry 155 to attenuate frequencies at which the sensitive transaction information is stored, thereby outputting a filtered signal out of the secure enclosure 195. The filter 170 and/or additional filter 180 may be, for example, low-pass filters or band-pass filters. If filters 170/180 are low-pass filters, their cutoff frequency may be, for example, 5 Hz, 10 Hz, 25 Hz, 50 Hz, 75 Hz, 100 Hz, 125 Hz, 150 Hz, 175 Hz, or 200 Hz. This cutoff frequency may depend on the frequency above which sensitive information begins to get encoded—often around 100 Hz—which in turn may depend on the baud rate of the NFC transceiver. Any transaction information is substantially attenuated, reduced, or at least partially filtered out in this filtered signal, so it is safe to have it go outside of the secure enclosure 195 without fear that a malicious party would be able read the transaction information from it. The transaction information may be further attenuated or reduced from the filtered signal by passing the filtered signal from the filter 170 through a comparator within the secure enclosure 195. The resulting signal may be of limited use in terms of analog feedback to the main processor 105, however. Placing ADC 175, or an additional low-resolution ADC into the secure enclosure with the filter 170, is another solution that of attenuates/reduces even more transaction data from the filtered signal than just the filter 170 alone while still allowing analog feedback at the main processor 105. Additional comparators/ADCs can similarly be added to the filter 140. Additional components may be added to either side of the filter 170 (or filter 140) for polarity inversion, phase inversion, or level shifting/translation.

The filter 170 is illustrated in FIG. 1 and FIG. 2 as branching off, via a solid line, from a path between the NFC receiver circuitry 155 and the FPGA 165. The filter 170 may alternately or additionally branch off from a path between the FPGA 165 and the secure processor 110, or from a path between the NFC antenna 150 and the NFC receiver circuitry 155 either inside or outside the secure enclosure 195, as suggested in FIG. 1 and FIG. 2 via dashed lines.

The ADC 175 can be used to convey an indicator of that an NFC-capable transaction object is in proximity to the NFC antenna 150. The ADC 175 may be optional depending on the types of inputs that the main processor 105 is configured to receive—that is, the ADC 175 is unnecessary if the main processor 105 is configured to receive analog signals.

As with the IC proximity detection signal 122 and the filtered mag stripe information signal discussed above, the filtered NFC information signal is generally received by the main processor 105 before the main processor 105 receives from the secure processor 110 the processed dataset corresponding to the NFC transaction information. The filtered magstripe signal effectively allows the main processor 105 to perform a few tasks before they are needed to speed up operation of the POS system 100 during a transaction. For example, the main processor 105 can, in response to receipt of the filtered magstripe signal, wake itself up from a low-power or "sleep" state into a higher-power state, turn on or wake up a receipt printer, turn on or wake up the network interfaces 197, cache subroutines or information necessary to conduct an NFC transaction in memory, or a combination thereof. The filtered mag stripe signal can wake up the main processor 105 itself if it feeds into one or more general purpose input/output (GPIO) pins, for example including an inter-integrated circuit (I2C) pin. Generation and sending of the filtered NFC signal directly to the main processor 105 and bypassing the secure processor 110 ultimately produces the technical benefit and effect of speeding up operation of the POS system 100 and making transaction processing more efficient while maintaining security.

Because the NFC transceiver can include a number of NFC antennae 150, and because differences in amplitude, frequency, and signal receipt timing can be conveyed through the filtered NFC signal to the main processor 150, the main processor 105 can efficiently provide detailed feedback to the user of the POS system 100. Differences in amplitude, frequency, and and/or signal receipt timing between multiple different NFC antennae 150 or between the same NFC antenna 150 at different times can help the main processor 105 track a location of the NFC-capable transaction object 450 relative to the NFC antennae 150 as illustrated and discussed further with respect to FIGS. 4A-4C, FIGS. 5A-5B, and FIG. 7. The filtered NFC signal can also convey certain user behaviors, such as shaking hands, that could be detrimental to NFC read quality and that the main processor can provide feedback 410D on as illustrated and discussed with respect to FIG. 4D and FIG. 7.

The main processor 105 and/or secure processor 110 may include instructions for one or more applications that may correspond to the type of transaction object and type of transaction object information. Transaction object information may include credit card information, debit card information, automated teller machine (ATM) information, gift card account information, transit account information, identification card information, game token card information, ticket information, bank account information, credit union account information, online gaming account information, HSA/FSA account information, health insurance account information, healthcare information, or some combination thereof. The main processor 105 and/or secure processor 110 may run applications specifically concerning any of these transaction object types or transaction object information types, as well as any of the transaction object reader interfaces 120/130/150 and/or transaction object reader circuitry 870 as illustrated and discussed with respect to FIG. 8.

While these application(s) are running, the main processor 105 receives processed dataset that includes processed transaction information from the secure processor 110, the processed transaction information having been encrypted, password-protected, or otherwise processed by the secure processor 110 before its receipt by the main processor 105. The processed dataset may also include user input information that has been encrypted, password-protected, or otherwise processed by the secure processor 110 before its receipt by the main processor 105. The user input information may correspond to information input by a user through input device circuitry 860 such as a keyboard, a number pad, touchscreen, or touch-sensitive surface. The input device circuitry 860 may be at least partially within the secure enclosure 195 to prevent these inputs from being accessible to a malicious party. The user input information may include, for example, a user's personal identification number (PIN) code, a user's signature, a user's selection in response to a charity donation request, a user's selection in response to a question asking whether or not the user desires a receipt and/or if the user would like a printed receipt or an electronic receipt sent to the user's electronic device, or identifying information about the user such as a name, physical address, e-mail address, or phone number. The application running on the main processor 105 may then send the processed dataset, either all together or piecemeal, via the network interface(s) 197, to one or more appropriate servers in order to complete the transaction. The one or more appropriate servers depend on the type of transaction object and type of transaction object information, and may include servers corresponding to any of the types of transaction objects or transaction object information listed above or with respect to the transaction object reader interfaces 120/130/150 and/or transaction object reader circuitry 870 as illustrated and discussed with respect to FIG. 8. The applications running on the main processor 105 may also generate one or more graphical user interfaces (GUIs) specific to any of the types of transaction objects or transaction object information listed above or with respect to the transaction object reader interfaces 120/130/150 and/or transaction object reader circuitry 870 as illustrated and discussed with respect to FIG. 8.

Figure 8:
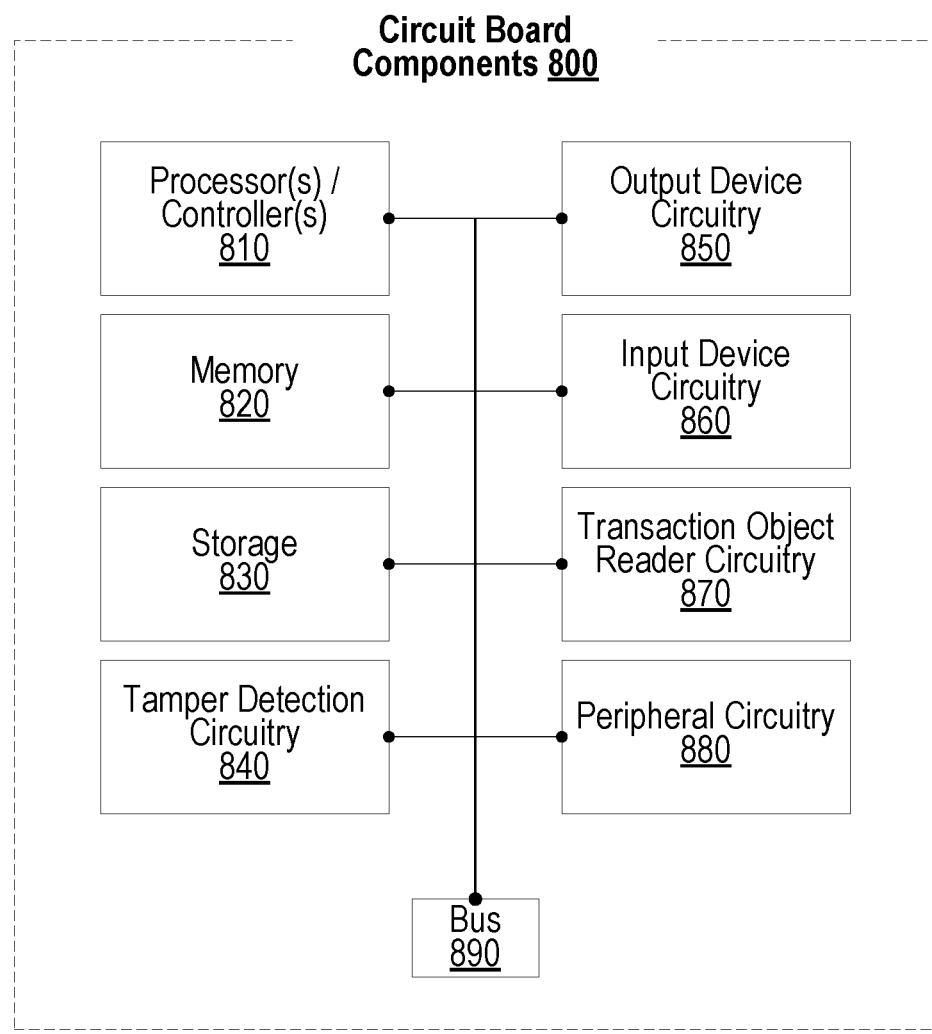
FIG. 8 is a block diagram of exemplary components that may be present on the circuit board.

The output device(s) 185 of FIG. 1 and FIG. 2 may include, for example, a display screen, a touchscreen, a printer, a speaker, a headset interface such as an audio jack, a vibration motor/actuator, one or more light bulbs arranged in a line or grid or other pattern, one or more light-emitting diodes arranged in a line or grid or other pattern, any other type of output device discussed with respect to the output device circuitry 850 of FIG. 8, or some combination thereof. The output device circuitry 150 may include drivers, codecs, controllers, processors, combinations thereof, or any other circuitry used to connect to, control, and/or drive output device 185.

The secure enclosure 195 refers to an enclosure or housing that includes tamper detection circuitry 115 integrated into the enclosure or housing itself, for example along the surfaces and/or filling an interior. Circuitry that is within the secure enclosure 195 is protected or secured, while circuitry that is outside of the secure enclosure 195 is generally unprotected and unsecured relative to the circuitry inside the secure enclosure 195. The secure processor 110 of FIG. 1 and FIG. 2 is illustrated within the secure enclosure 195 to protect or secure the secure processor 110. The tamper detection circuitry 115 can interface with the secured processor 110 to help the secured processor 110 identify an attempt by a malicious party to tamper with the secure enclosure.

The tamper detection circuitry 115 can include a variety of different types of sensors and sensing methods. The tamper detection circuitry 115 can use a "tamper mesh," in which two long conductive tamper trace lines run in parallel and in a zig-zagging and/or boustrophedonic pattern that covers at least a majority of at least one surface of the secure enclosure 195. A small example of two lines in a boustrophedonic pattern is illustrated in the "tamper circuitry 115" box of FIG. 1 and FIG. 2. The two tamper trace lines are at different voltages. One of these tamper trace lines may be at ground while the other is at a non-ground voltage, or they may both be at different non-ground voltages. The tamper detection circuitry 115 includes voltage sensors that detect any changes in voltage along either or both lines. A malicious party attempting to drill into the secure enclosure 195 would likely break at least one of these conductive trace lines, connect the two lines together via the conductive metal of the drill itself, short two disparate portions of the same line together via the conductive metal of the drill itself, or some combination thereof. All of these scenarios can be detectable by the secure processor 110 via the voltage sensor(s) as a voltage fluctuation or change exceeding a predefined voltage change threshold as measured via the voltage sensors.

The tamper detection circuitry 115 can alternately or additionally include inductive sensors that detect nearby objects that are metal and/or have conductive properties in response to an inductive sensor measurement exceeding a predefined threshold. The tamper detection circuitry 115 can alternately or additionally include capacitive sensors that detect touches to surface(s) of the secure enclosure 195 in response to a capacitive sensor measurement exceeding a predefined threshold, where the surface(s) of the secure enclosure 195 should remain internal and should not be touched.

An attempt to open, damage, drill into, or otherwise tamper with the secure enclosure 195 can be identified by the secure processor 110 in concert with the tamper circuitry 115. In response, the secure processor can shut down one or more transaction object read interfaces, and in some cases can also convey a warning that the POS system 100 has been tampered with to a user via output device 185 and/or to a remote server via network interface(s) 197, either through main processor 105 or through a direct line (not pictured in FIG. 1).

An additional optional filter 177 is illustrated in FIG. 1 and FIG. 2 as branching off from either or both of a path between the IC chip contact block 120 and the EMV circuitry 125, or a path between the EMV circuitry 125 and the secure processor 110. The filter 177 behaves similarly to the filter 170 or the filter 140 in that it filters sensitive/transaction/payment information from a signal coming from the IC chip contact block 120 and/or EMV circuitry 125, produces a filtered signal in which that sensitive/transaction/payment information is attenuated, and provides that filtered signal to the main processor 105. Like the filters 170 and 140, the filter 177 may be a low-pass filter or a band-pass filter or some combination thereof. In some cases, any of the filters 140/170/177 may be high-pass filters instead. The filtered signal produced by the filter 177 behaves very similarly to the IC prox signal 122 in that it can be used by the main processor 105 to determine that a card is in the IC chip card slot, and can trigger any of the actions by the main processor 105 or devices connected to it that the IC prox signal 122 (or any of the filtered signals provided by filter 170 or filter 140) is described herein as being capable of triggering. The filter 177 may be useful to expand the capabilities of an IC chip contact block 120 with a missing, broken, or malfunctioning IC prox signal 122 line or functionality. The filtered signal produced by filter 177 may also be able to provide slightly more analog-style information, in that it may help indicate when the IC chip contact block 120 has a good connection or a poor connection to the IC chip of an inserted IC chip card, where a poor connection to the IC chip might be indicative of the card being inserted in a crooked fashion into the IC chip card slot of the POS device 100. This may allow the main processor 105 to provide feedback as illustrated via feedback 910 illustrated in FIGS. 9A-9B.

One of the technical benefits to bypassing the secure processor 110 via the filter 170 or filter and/or buffer 140 and/or IC prox signal 122 and/or filter 177 is speeding up the ability of the main processor 105 to provide feedback to the customer. Sending information from the transaction object reader interfaces, through the secure processor 110, and to the main processor can take several hundred milliseconds to several thousand milliseconds. On the other hand, sending information from the transaction object reader interfaces to the main processor through the filters 140/170/177, bypassing the secure processor 110, generally takes under one hundred milliseconds, sometimes even under ten milliseconds. The result is a marked improvement in the efficiency, speed, and responsiveness of the POS device 100.

FIG. 2 is a block diagram illustrating a dual-unit point of sale (POS) system with a main processor, a secure processor, and transaction object reader interfaces that both connect to the secure processor and bypass the secure processor when it is advantageous to quickly notify the main processor of a transaction object in the proximity.

The dual-unit POS system 100B of FIG. 2 is split into a reader device 210 having the secure processor 110 and a host device 220 having the main processor 105. Examples of dual-unit POS systems 100B are illustrated in FIGS. 5A-5B and FIGS. 6A-6B.

The reader device 210 and host device 220 of FIG. 2 are illustrated with connections between the two, the connections corresponding to the secure processor 110, the IC proximity detection signal 122, the filter and/or buffer 140 that corresponds to the filtered magstripe signal, and the filter 170 that corresponds to the filtered NFC signal. These connections may be wired connections, such as in embodiments in which the reader device 210 or a cable associated with the reader device 210 plugs in to the host device 220, or vice versa. Such wired connections may use Universal Serial Bus (USB) plugs/ports, Apple® Lightning® plugs/ports, TRS/TRRS audio/microphone plugs/ports, Ethernet plugs/ports, or some combination thereof. The exemplary dual-unit POS systems 100B illustrated in FIGS. 5A-5B and FIGS. 6A-6B are illustrated as connecting via an audio jack plug and port.

The reader device 210 and host device 220 of FIG. 2 may alternately connect wirelessly, for example via a short-range wireless communication transceivers located in both the reader device 210 (not pictured) and host device 220. Such a connection may use short-range wireless communication types such as Bluetooth® communications, Bluetooth® Low Energy® communications, 802.xx Wi-Fi communications, wireless local area network (WLAN) communications, NFC communications, RFID communications, radar communications, light-based communications, any other type of communications or connections discussed with respect to FIG. 8, or some combination thereof.

Note that while the ADC 145, ADC 175, and additional filter 180 are illustrated as being within the secure enclosure 195 of the reader device 210 in FIG. 2, each may be outside of the secure enclosure 195 and within a housing of the reader device 210, or within a housing of the host device 220, or within wired or wireless transceiver circuitry connecting the reader device 210 and host device 220, or some combination thereof.

The reader device 210 and host device 220 both include their own output devices 185 in FIG. 2. Examples of this are illustrated in FIGS. 5A-5B and FIGS. 6A-6B. It should be understood that this is optional, and in some cases only one or the other of the reader device 210 and host device 220 includes an output device 185.

Figure 3:
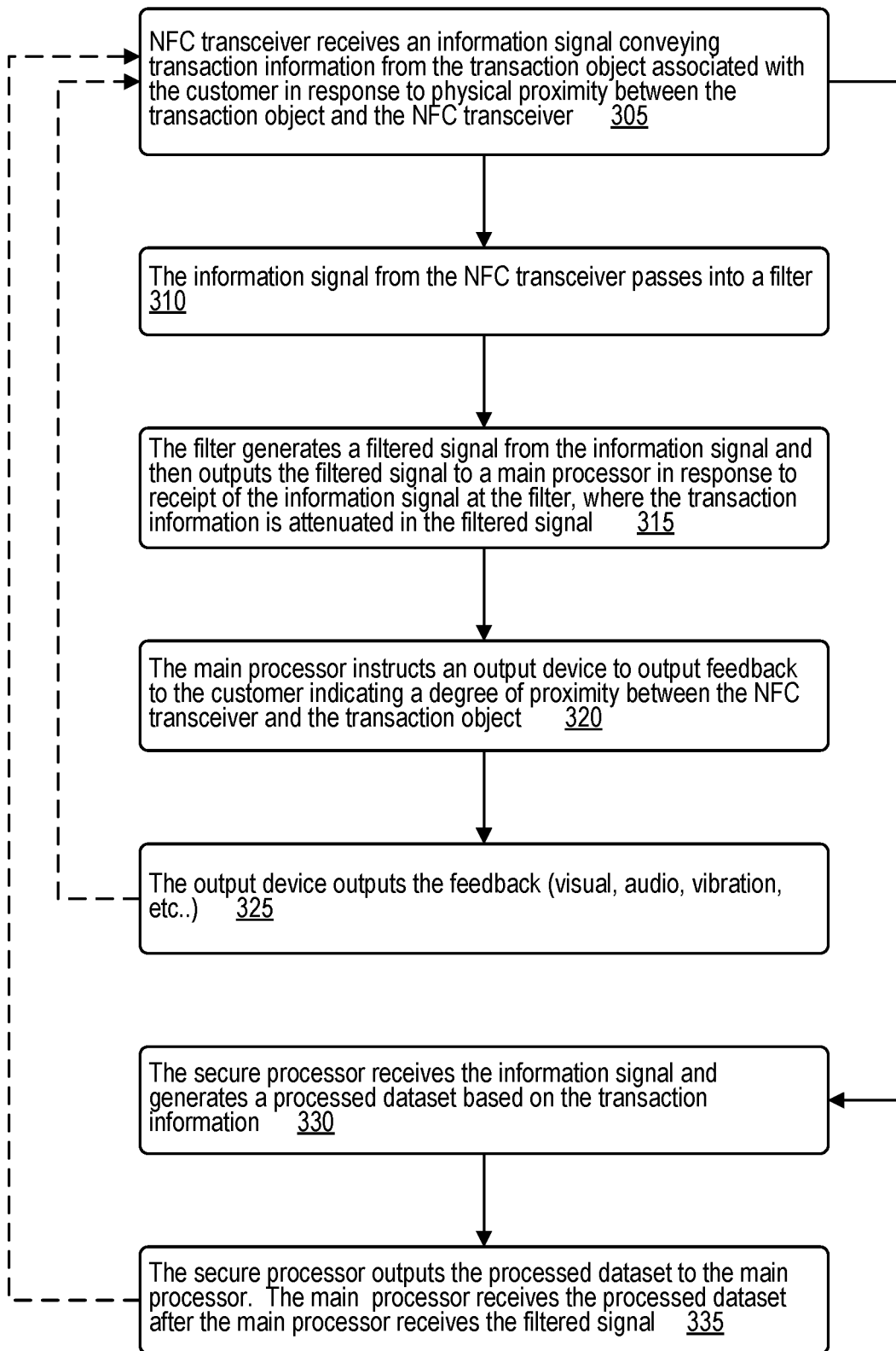
FIG. 3 is a flow diagram illustrating operations through which a transaction object reader device with a near field communication (NFC) transceiver is able to quickly provide feedback to a user regarding how close the user's transaction object is to the NFC transceiver by bypassing the secure processor while still maintaining security and maintaining full use of the secure processor.

FIG. 3 is a flow diagram illustrating operations through which a transaction object reader device with a near field communication (NFC) transceiver is able to quickly provide feedback to a user regarding how close the user's transaction object is to the NFC transceiver by bypassing the secure processor while still maintaining security and maintaining full use of the secure processor.

At step 305, the NFC transceiver receives an information signal conveying transaction information from the transaction object associated with the customer in response to physical proximity between the transaction object and the NFC transceiver. Step 305 precedes both step 310 and step 330. Step 310 and the steps that follow it represent the filter path of FIG. 1 and FIG. 2 that bypasses the secure processor 170 in favor of a more direct path to the main processor 105 through the filter 170. Step 330 and the steps that follow it represent the secure processor path of FIG. 1 and FIG. 2 that feeds the transaction information to the secure processor 110.

At step 310, information signal from the NFC transceiver passes into the filter 170. At step 315, the filter 170 generates a filtered signal from the information signal and then outputs the filtered signal to a main processor in response to receipt of the information signal at the filter 170. The transaction information is attenuated in the filtered signal. The filter 170 may include, for example, a low-pass filter or a band-pass filter.

At step 320, the main processor 105 instructs an output device 185 to output feedback to the customer indicating a degree of proximity between the NFC transceiver and the transaction object. At step 325, the output device outputs the feedback, which may be visual feedback, audio feedback, vibration feedback, or some combination thereof. Examples of visual feedback 410/510/610 are illustrated in FIGS. 4A-4D, FIGS. 5A-5B, and FIGS. 6A-6B. Audio or vibrational feedback can, for example, modulate an amplitude or frequency of sound or vibration based on position, for example getting higher in either or both as the NFC-capable transaction object 450 approaches the NFC transceiver, and lower in either or both as the NFC-capable transaction object 450 gets farther from the NFC transceiver, or vice versa. After step 325, the process may return to step 305.

At step 330, the secure processor receives the information signal and generates a processed dataset based on the transaction information. Generating the processed dataset may include encrypting, password-protecting, or otherwise processing the transaction information as discussed above, and may also include user inputs from input device circuitry 860 such as PIN numbers or signatures as discussed above.

At step 335, the secure processor 110 outputs the processed dataset to the main processor 105. The main processor 105 receives the processed dataset after the main processor receives the filtered information signal.

While the flow diagram of FIG. 3 discussed the NFC transceiver and an NFC-capable transaction object, it may also apply to the magstripe reader if the magstripe read head 130 and magstripe circuitry 135 are read in place of the NFC antenna 150 and related circuitry, and the filter and/or buffer 140 are read in place of the filter 170. FIG. 3 may also it may also apply to the IC chip reader if the IC chip contact block 120 and EMV circuitry 125 are read in place of the NFC antenna 150 and related circuitry, and the IC proximity detection signal 122 is read in place of the filtered information.

Figure 4A:
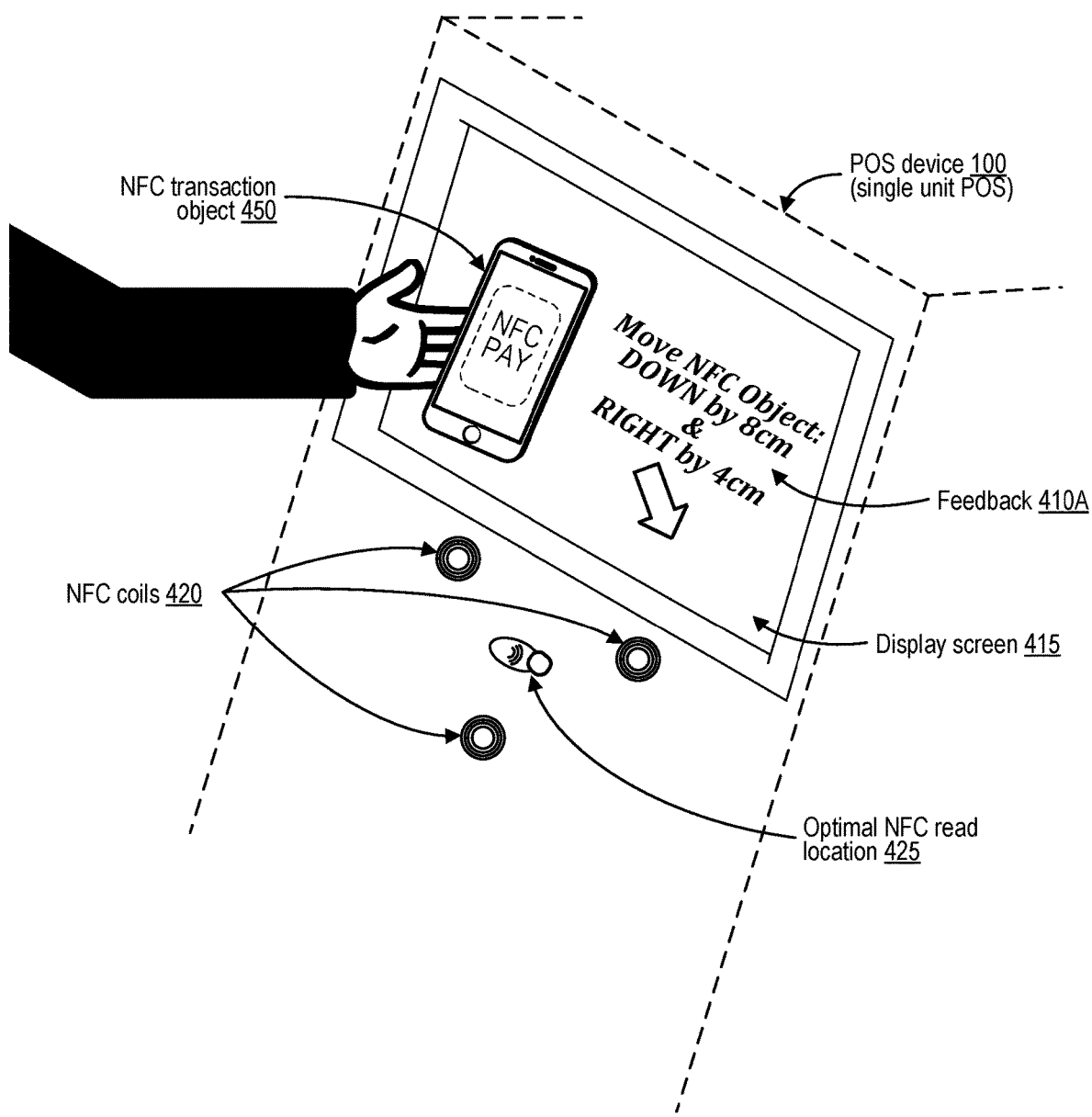
FIG. 4A illustrates visual positioning feedback on a display screen of a single-unit point of sale (POS) system that has three near field communication (NFC) antenna coils.

FIG. 4A illustrates visual positioning feedback on a display screen of a single-unit point of sale (POS) system that has three near field communication (NFC) antenna coils.

In some cases, multiple NFC antennae 150 may be used in place of the one suggested in FIG. 1 and FIG. 2. This allows the main processor 105 to identify a location of the NFC-capable transaction object relative to the NFC antennae 150 based on the relative signal strengths at least of the NFC antennae 150, based on timing differences between receipt of signals at each of the NFC antennae 150, based on signal frequency differences at each of the NFC antennae 150, or some combination thereof.

If there are three or more NFC antennae 150, as in the three NFC antenna coils 420 of FIG. 4A this allows for triangulation of the location of the NFC-capable transaction object 450 along a 2D plane as pictured in FIG. 4A. Detailed feedback 410A can be given by the main processor 105 to the user via the output device 185 of FIG. 4A—the display screen 415—as to exactly which directions the NFC-capable transaction object 450 should be moved in. The feedback 410A of FIG. 4A, for example, states "move NFC object down by 8 centimeters and right by 4 cm" and illustrates an arrow pointing in the appropriate diagonal down-right direction.

Figure 4B:
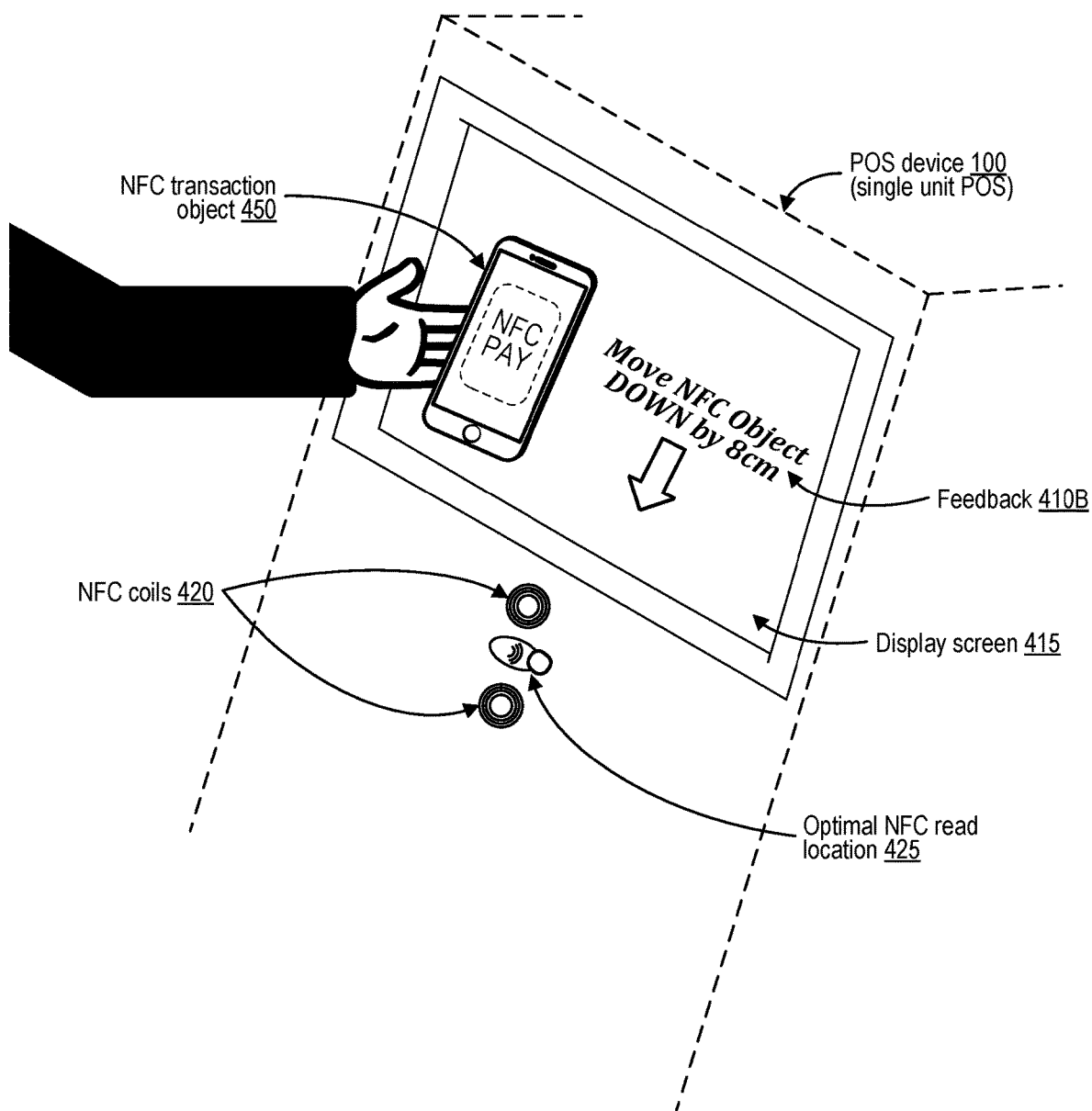
FIG. 4B illustrates visual positioning feedback on a display screen of a single-unit point of sale (POS) system that has two near field communication (NFC) antenna coils.

FIG. 4B illustrates visual positioning feedback on a display screen of a single-unit point of sale (POS) system that has two near field communication (NFC) antenna coils.

If there are two NFC antennae 150, the NFC-capable transaction object can still be located along a single axis extending along a vector connecting the two NFC antennae 150 as pictured in FIG. 4B, which illustrates a POS system 100 with two NFC antenna coils 420. Somewhat detailed feedback 410B can be given by the main processor 105 to the user via the output device 185 of FIG. 4B—the display screen 415—as to which direction along the axis the NFC-capable transaction object 450 should be moved in. The feedback 410B of FIG. 4B, for example, states "move NFC object down by 8 centimeters" and illustrates an arrow pointing down.

Figure 4C:
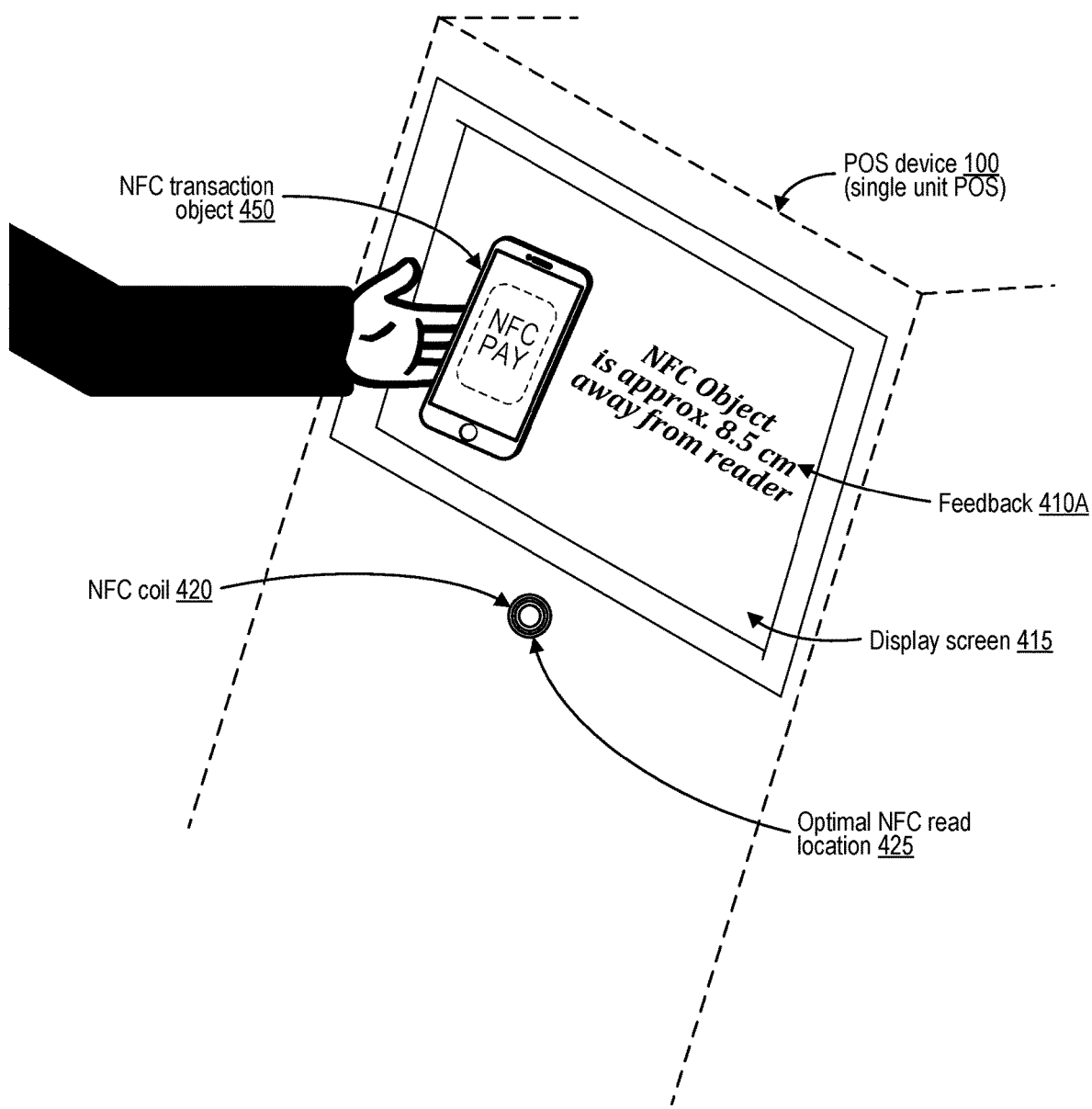
FIG. 4C illustrates visual positioning feedback on a display screen of a single-unit point of sale (POS) system that has a single near field communication (NFC) antenna coil.

FIG. 4C illustrates visual positioning feedback on a display screen of a single-unit point of sale (POS) system that has a single near field communication (NFC) antenna coil.

If there is only one NFC antenna 150, the NFC-capable transaction object can still be located within a radius around the NFC antenna as pictured in FIG. 4A, which illustrates a POS system 100 with a single NFC antenna coil 420. Less detailed feedback 410A can be given by the main processor 105 to the user via the output device 185 of FIG. 4C—the display screen 415—as to roughly how far the NFC-capable transaction object 450 is from the NFC antenna 150. The feedback 410A of FIG. 4A, for example, states "NFC object is approx. 8.5 centimeters away from reader."

An additional non-illustrated embodiment with at least four NFC antenna coils 420, for example arranged in a tetrahedron, though not illustrated, could allow the main processor 105 to locate the NFC-capable transaction object 450 relative to the NFC antenna coils 420 in three dimensions. Very detailed feedback 410, such as "move NFC object down by 8 centimeters and right by 4 cm and forward by 2 cm" can be given by the main processor 105 to the user via output device 185 as to exactly which directions in any dimension the NFC-capable transaction object 450 should be moved in.

Other types of feedback not illustrated herein can also be used. For example, the main processor can generate a heat map on a display screen 415 identifying places along the display screen 415 or along another portion of the POS device 100 where the NFC-capable transaction object 450 would be close to the NFC transceiver. This would be particularly useful if multiple NFC antenna coils 420 are spaced relatively far apart from each other.

In situations where multiple NFC antenna coils 420 are used, there may be one "main" NFC antenna coil 420 that is most powerful and used for reading and/or transmission, and one or more "secondary" or NFC antenna coils 420 that are smaller and/or weaker and used more for position determination of the NFC-capable transaction object 450.

Besides outputting feedback to the user/customer, the main processor 105 and/or secure processor 110 can perform other functions based on the filtered NFC information. For example, if the filtered NFC information consistently shows a weak signal or that the NFC-capable transaction object 450 is far away from the NFC transceiver, the main processor 105 and/or secure processor 110 could temporarily (i.e., for a predetermined period of time) or permanently increase power directed to the NFC antennae 150 and/or the related circuitry illustrated and discussed with respect to FIG. 1 and FIG. 2. Power may be supplied by one or more batteries within the housing 190, within the reader device 210, within the host device 220; from an external power source such as an external battery or wall outlet; or some combination thereof.

Figure 4D:
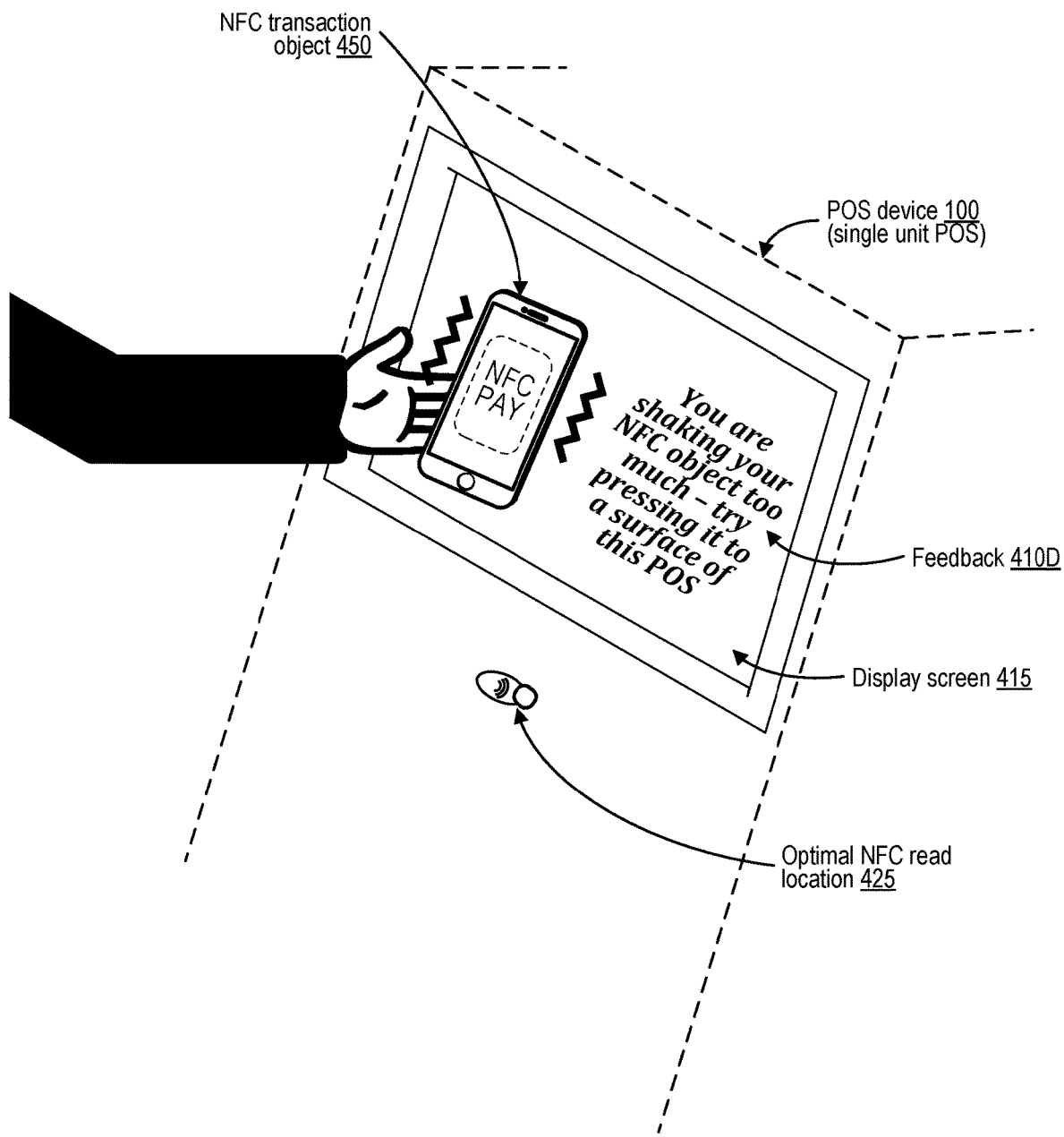
FIG. 4D illustrates visual shaking feedback on a display screen of a single-unit point of sale (POS) system that uses near field communication (NFC).

FIG. 4D illustrates visual shaking feedback on a display screen of a single-unit point of sale (POS) system that uses near field communication (NFC).

The main processor 105 of FIG. 4D determines that the NFC-capable transaction object 450 of FIG. 4D is shaking, based generally on a sinusoidal, "wavy," "zigzaggy," or otherwise irregular input from the filtered NFC information signal. An example of such an input at the main processor 105 is illustrated as "shaky hand 750" in FIG. 7. Essentially, the main processor 105 looks for the distance between the NFC-capable transaction object 450 and the NFC coil(s) 420, and or the triangulated position determination, to be wavering.

Because a shaking NFC-capable transaction object 450 can decrease quality and reliability of the NFC read process, the main processor 105 provides helpful feedback 410D through display screen 415 based on this determination of shaking, namely "you are shaking your NFC object too much—try pressing it to a surface of this POS."

Figure 5A:
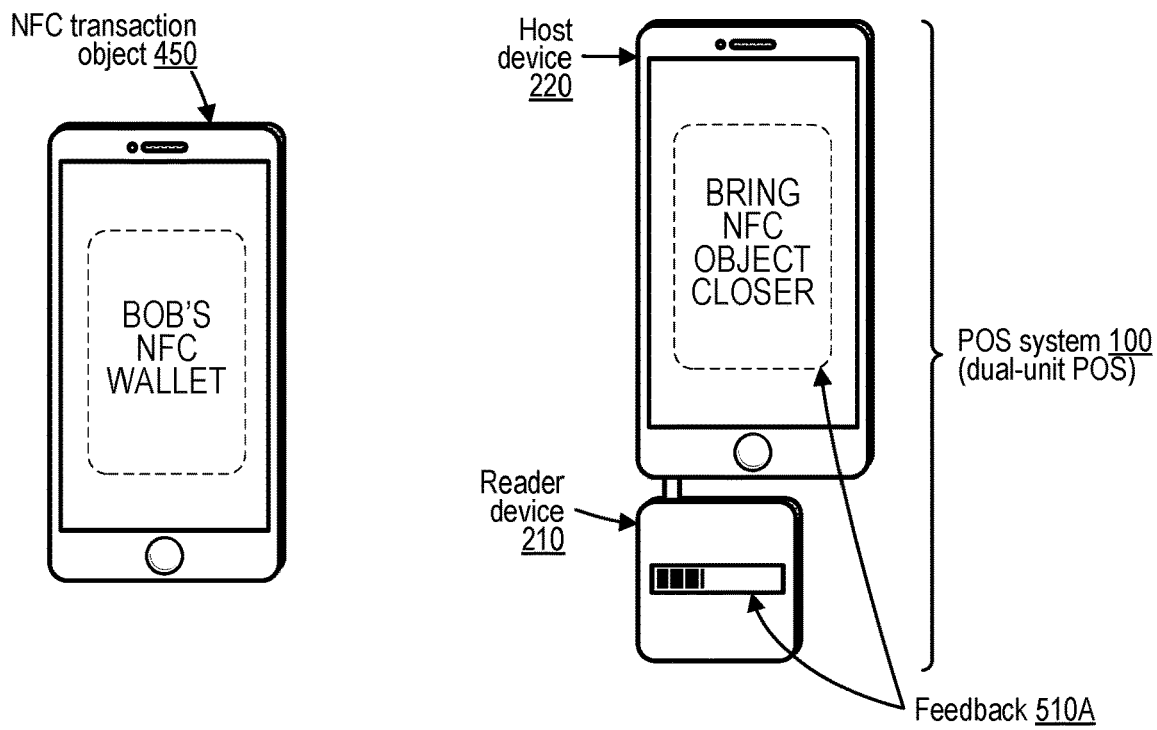
FIG. 5A illustrates visual positioning feedback on both a display screen and a meter interface of a dual-unit point of sale (POS) system that uses near field communication (NFC) in which the transaction object is far.

FIG. 5A illustrates visual positioning feedback on both a display screen and a meter interface of a dual-unit point of sale (POS) system that uses near field communication (NFC) in which the transaction object is far.

Figure 5B:
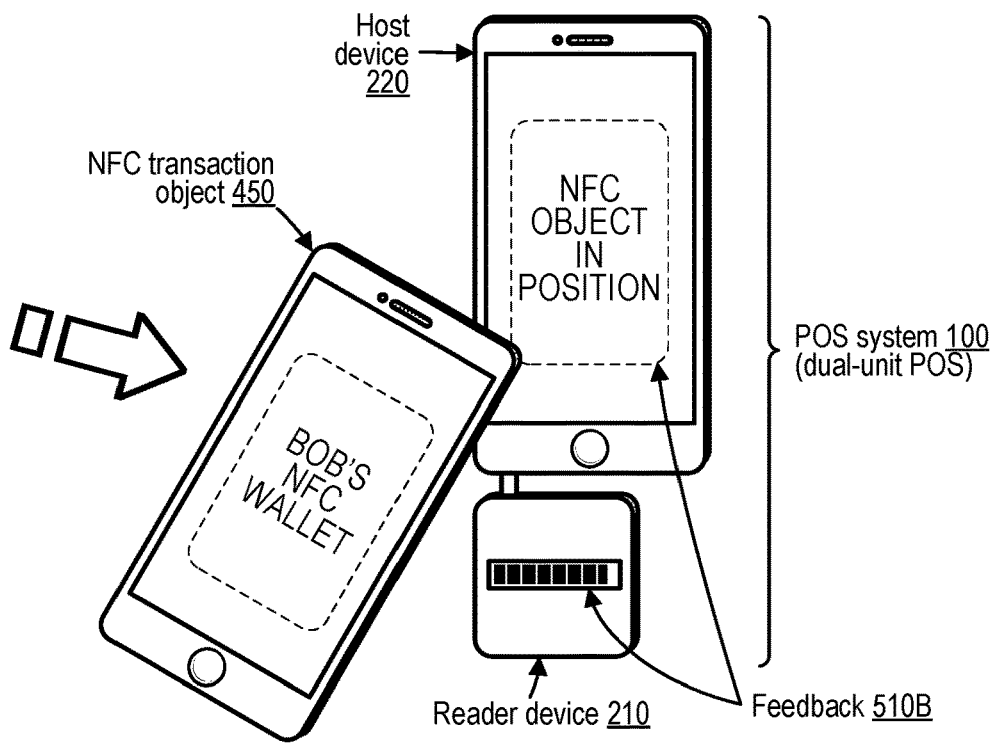
FIG. 5B illustrates visual positioning feedback on both a display screen and a meter interface of a dual-unit point of sale (POS) system that uses near field communication (NFC) in which the transaction object is close.

FIG. 5B illustrates visual positioning feedback on both a display screen and a meter interface of a dual-unit point of sale (POS) system that uses near field communication (NFC) in which the transaction object is close.

Another type of single-antenna NFC-based feedback 510 similar to the feedback 410C of FIG. 4C is illustrated in FIGS. 5A-5B. Here, the reader device 210 includes a meter-style output device 185B similar visually to a classic mercury thermometer or to a single bar of a bar graph. The length of the bar represents the distance between the NFC-capable transaction object 450 to the NFC transceiver at the reader device 210, where a longer meter means the NFC-capable transaction object 450 is closer to the NFC transceiver and a shorter bar means the NFC-capable transaction object 450 is farther from the NFC transceiver. This type of feedback 510 is useful and effective here due to the small size of the reader device 210. Additional written feedback 510 ("Bring NFC Object Closer," "NFC Object In Position") is also provided at a display screen output device 185A of the host device 220 to help provide additional context to feedback 510 at the meter output device 185B of the reader device 210 of FIGS. 5A-5B.

In place of the meter output device 185 of FIGS. 5A-5B, an output device that is a row/column of light emitting diodes (LEDs) or other types of lights can emulate a meter. For example, the meter can be at full length when three out of three LEDs are lit, at two-thirds length when two out of three LEDs are lit, at one-third length when one out of three LEDs are lit, and at zero length when no LEDs are lit. Essentially, this type of meter or step interface shows a point along a range or spectrum. Alternatively, brightness of one or more LEDs can be used, getting brighter when the meter would have gotten longer, and getting dimmer when the meter would have gotten shorter, or vice versa. Alternatively, color of one or more LEDs can be used, going further to the red end of the spectrum when the meter would have gotten longer, and going further to the violet/blue end of the spectrum when the meter would have gotten shorter, or vice versa.

FIG. 6A illustrates visual card-sliding feedback on both a display screen and a meter interface of a dual-unit point of sale (POS) system where a magstripe card is slid properly.

FIG. 6B illustrates visual card-sliding feedback on both a display screen and a meter interface of a dual-unit point of sale (POS) system where a magstripe card is slid crookedly.

The reader device 210 of FIGS. 6A-6B employs a similar meter-style output device 185B of the reader device 210, this time giving feedback 610 as to whether the magstripe transaction card 620 is slid properly and straight as in FIG. 6A, showing a long meter, or poorly and crookedly as in FIG. 6B, showing a short meter. This feedback 610 is provided by the main processor 105 based on the filtered signal from the filter 140. Additional written feedback is displayed via a display screen output device 185A of the host device 220, writing, respectively, "Good Swipe—Stripe Tracks Aligned" and "Crooked Swipe—Stripe Tracks Misalign."

It should be understood that a POS system 100 and/or transaction object reader device 210 as discussed herein can be made with any combination of components, features, and/or elements illustrated in and/or discussed with respect to at least FIGS. 1, 2, 3A-3B, 4A-4D, 5A-5B, 6A-6B, 9A-9B, and 8.

Figure 7:
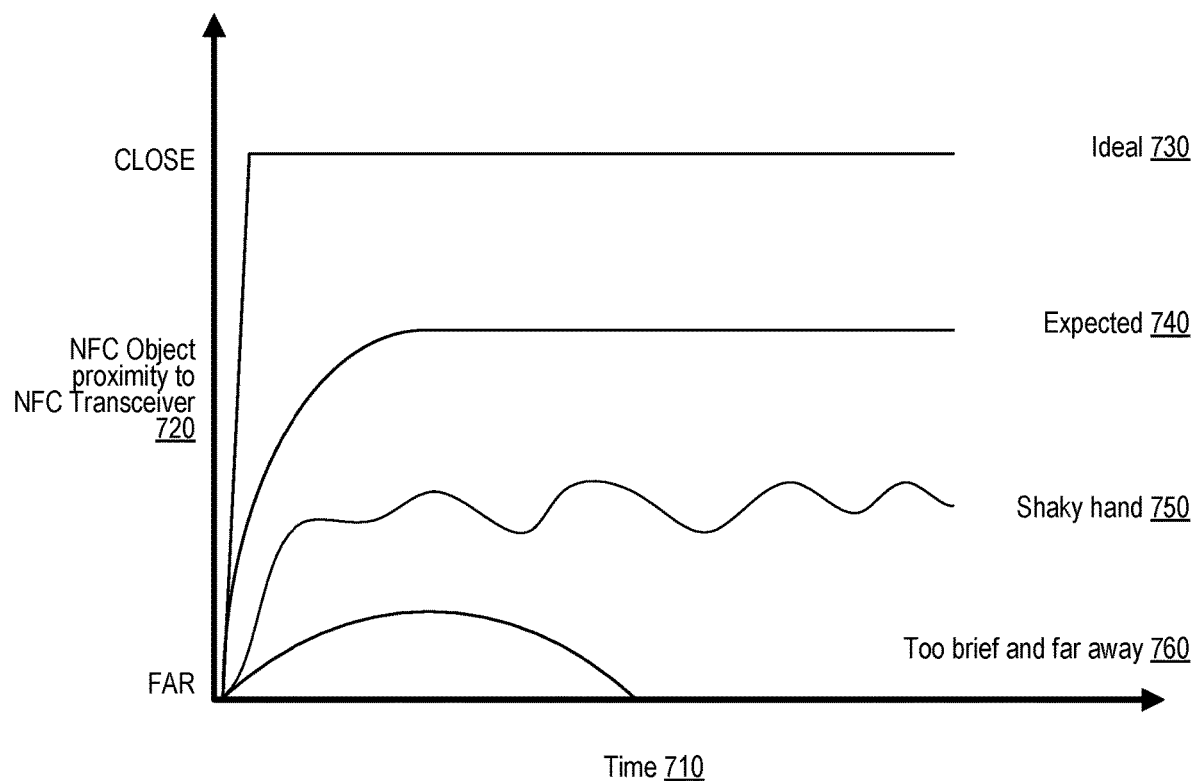
FIG. 7 is a graph illustrating proximity near field communication (NFC) transceiver proximity against time.

FIG. 7 is a graph illustrating proximity near field communication (NFC) transceiver proximity against time.

The horizontal axis 710 measures time 710 moving forward from left to right. The vertical axis 720 measures NFC-capable transaction object 450's proximity to an NFC transceiver 720 as conveyed to the main processor 105 via the filtered signal, where the distance becomes closer (due to stronger/higher amplitude signal) higher along the axis.

A first line 730 is illustrated representing an ideal read, such as if the NFC-capable transaction object 450 suddenly materialized out of nowhere right on top of the NFC transceiver. A second line 740 represents an expected successful read, where the user takes a little more time to find the correct place but gets pretty close to the NFC transceiver of the POS device 100 pretty quickly. Both the first line 730 and the second line 740 should represent successful NFC reads.

A third line 750 represents a user with a shaky hand, where the NFC-capable transaction object 450 appears to "wobble" and the amplitude of the signal is weakened, likely as a result of the shaking as well as a farther distance. This third line may or may not represent a successful read. A fourth line 760 represents a failed read in which the user never moves the NFC-capable transaction object 450 close enough to the NFC transceiver of the POS device 100 and pulls away too quickly as well.

FIG. 8 illustrates exemplary circuit board components 800 that may be used to implement an embodiment of the present invention. The circuit board 100 described herein may include any combination of at least a subset of the circuit board components 800. In some embodiments, the circuit board 100 may actually include multiple circuit boards connected in a wired or wireless fashion, some of which may be at least partially enclosed by the security housing.

The circuit board components 800 of FIG. 8 may include one or more processors, controllers, microcontrollers, application specific integrated circuits (ASICs), or field-programmable gate arrays (FPGAs) 810. These may in some cases aid in tamper detection, such as by performing at least some subset of the functions identified in FIG. 8. The circuit board components 800 of FIG. 8 may include one or more memory components 810 that may store, at least in part, instructions, executable code, or other data for execution or processing by the processor or controller 810. The memory components 810 may include, for example, cache memory, random access memory (5 AM), read-only memory (ROM), or some other type of computer-readable storage medium.

The circuit board components 800 of FIG. 8 may further includes one or more computer-readable storage medium(s) 830 for storing data, such as a hard drive, magnetic disk drive, optical disk drive, flash memory, magnetic tape based memory, or another form of non-volatile storage. These may, for example, store credit card information, cryptographic keys, or other information, and may in some cases encrypt or decrypt such information with the aid of the processor or controller 810. The computer-readable storage medium(s) 830 may in some cases store, at least in part, instructions, executable code, or other data for execution or processing by the processor or controller 810.

The circuit board components 800 of FIG. 8 may include tamper detection circuitry 840, which may include any of the tamper detection circuit 150 discussed herein, and may include the board connector piece holder(s) 255 and any components discussed in FIG. 8.

The circuit board components 800 of FIG. 8 may include output device circuitry 850, which may include, for example, communication circuitry for outputting data through wired or wireless means, display circuitry for displaying data via a display screen, audio circuitry for playing audio via headphones or a speaker, printer circuitry for printing data via a printer, or some combination thereof. The display screen may be a liquid crystal display (LCD), a plasma display, an organic light-emitting diode (OLED) display, an electronic ink display, a projector-based display, a holographic display, or some combination thereof. The printer may be inkjet, laserjet, thermal, or some combination thereof. In some cases, the output device circuitry 850 may allow for transmission of data over an headphone audio jack, a microphone jack, BLUETOOTH™ wireless signal transfer, radio-frequency identification (RFID), near-field communications (NFC), 802.11 Wi-Fi, cellular network data transfer, or some combination thereof. The output device circuitry 850 may also include The circuit board components 800 of FIG. 8 may include input device circuitry 860, which may include, for example, communication circuitry for outputting data through wired or wireless means, microphone circuitry for receiving audio data, user interface circuitry for receiving user interface inputs, or some combination thereof, and may include variable pressure detection. Touchscreens may be capacitive, resistive, acoustic, or some combination thereof. In some cases, the input device circuitry 860 may allow receipt of data over an headphone audio jack, a microphone jack, BLUETOOTH™ wireless signal transfer, radio-frequency identification (RFID), near-field communications (NFC), 802.11 Wi-Fi, cellular network data transfer, or some combination thereof. Input device circuitry 860 may receive data from an alpha-numeric keypad or keyboard, a pointing device, a mouse, a trackball, a trackpad, a touchscreen, a stylus, cursor direction keys, or some combination thereof. The input device circuitry 860 may also receive data from the transaction object reader circuitry 870.

The circuit board components 800 of FIG. 8 may include transaction object reader circuitry 870, which may include components capable of reading information from a transaction object, or may include circuitry supporting components capable of reading information from a transaction object, with the actual object reader components located off of the circuit board 100. The transaction object reader 870 may include at least one card reader. In this case, the transaction object may be a magnetic stripe onboard a transaction card, an integrated circuit (IC) chip onboard a transaction card, and/or a smartcard chip onboard a transaction card. The transaction card itself may be a credit card, a debit card, an automated teller machine (ATM) card, a gift card, a transit card, an identification card, a game token card, a ticket card, a bank card associated with a bank account, a credit union card associated with a credit union account, an online gaming card associated with an online gaming account, a healthcare card associated with a health savings account (HSA) or flexible spending account (FSA), or a user account card associated with a user account of another type, or some combination thereof. The transaction object reader 870 may include at least one wireless signal reader for reading information wirelessly. In this case, the transaction object may be any of the transaction-card-related transaction objects discussed above (but read wirelessly), or they may be non-card objects capable of wireless communication, such as smartphones, tablets, wearable devices, active near field communication (NFC) and/or radio-frequency identification (RFID) tags, passive NFC and/or RFID tags, or other mobile devices that are capable of wireless communication via NFC, RFID, Bluetooth®, Bluetooth® Low Energy®, WLAN, Wi-Fi, or some combination thereof.

Transaction object reader circuitry 870 may include, for example, a magnetic read head or other type of magnetic stripe reader that is capable of reading information from a magnetic stripe of a transaction card. Transaction object reader circuitry 870 can also include an integrated circuit (IC) chip reader and/or smartcard chip reader for reading an IC chip and/or smartcard chip embedded in a transaction card. Such an IC chip/smartcard chip can follow the Europay-MasterCard-Visa (EMV) payment chip standard. The IC chip/smartcard chip reader can be contact-based, in that it can include one or more conductive prongs that contact a conductive metal contact pad of the IC chip/smartcard chip. The IC chip/smartcard chip can instead be contactless and use a contactless antenna. The contactless antenna can also double as a receiver for near-field-communication (NFC) signals, radio-frequency identification (RFID) signals, Bluetooth® wireless signals, wireless local area network (WLAN) signals, 802.xx Wi-Fi signals, or some combination thereof, which can be sent from a transaction card or from a another type of transaction object as discussed above. In some cases, a transaction object may only send these wireless signals in response to receipt of a magnetic field or other wireless signals from the transaction object reader circuitry 870. For example, if the transaction object is a passive NFC/RFID tag or functions based on similar technology, it generates energy from the magnetic field or other wireless signals from the transaction object reader circuitry 870 via induction coil(s) that is then used to transmit the wireless signals that are ultimately read by the transaction object reader circuitry 870.

The information read from the transaction object by the transaction object reader circuitry 870, regardless of the type of the transaction object, may include at least credit card information, debit card information, automated teller machine (ATM) information, gift card account information, transit account information, identification card information, game token card information, ticket information, bank account information, credit union account information, online gaming account information, HSA/FSA account information, health insurance account information, healthcare information, or some combination thereof. Certain terms discussed herein should be understood to refer to transaction objects, including but not limited to "payment object," "transaction object," "financial object," "payment card," "transaction card," or "financial card."

Peripheral circuitry 880 may include any type circuitry permitting connection and use of computer support devices to add additional functionality to the circuit board 100. For example, peripheral circuitry 780 may support connection of a modem or a router. The components shown in FIG. 8 are depicted as being connected via a single bus 890. However, the components may be connected through one or more data transport means. For example, processor unit 810 and main memory 810 may be connected via a local microprocessor bus, and the storage medium 830, tamper detection circuitry 840, output device circuitry 850, input device circuitry 860, transaction object reader circuitry 870, and peripheral circuitry 880 may be connected via one or more input/output (I/O) buses.

FIG. 9A illustrates visual card-insertion feedback on both a display screen and a meter interface of a dual-unit point of sale (POS) system where a chip card is inserted properly.

FIG. 9B illustrates visual card-insertion feedback on both a display screen and a meter interface of a dual-unit point of sale (POS) system where a chip card is inserted crookedly.

The reader device 210 of FIGS. 9A-9B employs a similar meter-style output device 185B of the reader device 210 as in FIGS. 6A-6B, this time giving feedback 910 as to whether the IC chip transaction card 920 is inserted properly and straight as in FIG. 9A, showing a long meter, or poorly and crookedly as in FIG. 9B, showing a short meter. This feedback 910 is provided by the main processor 105 based on the IC prox signal 122 and/or the filtered signal from the filter 177. Additional written feedback is displayed via a display screen output device 185A of the host device 220, writing, respectively, "Good Insert—Good Contact" and "Crooked Insert—Poor Contact."

While various flow diagrams have been described above, it should be understood that these show a particular order of operations performed by certain embodiments of the invention, and that such order is exemplary. Alternative embodiments can perform the operations in a different order, combine certain operations, or overlap certain operations illustrated in or described with respect to each flow diagram.

The foregoing detailed description of the technology has been presented for purposes of illustration and description. It is not intended to be exhaustive or to limit the technology to the precise form disclosed. Many modifications and variations are possible in light of the above teaching. The described embodiments were chosen in order to best explain the principles of the technology, its practical application, and to enable others skilled in the art to utilize the technology in various embodiments and with various modifications as are suited to the particular use contemplated. It is intended that the scope of the technology be defined by the claim.

The invention claimed is:

1. A transaction object reader device that provides feedback to a user based on proximity of a transaction object to a transaction object read interface, the transaction object reader device comprising:
    the transaction object read interface that reads transaction object information from the transaction object in response to physical proximity between the transaction object and the transaction object read interface;
    a filter that outputs a filtered signal to a first processor in response to receipt of the transaction object information at the filter from the transaction object read interface, wherein transaction information in the transaction object information is at least partially attenuated out in the filtered signal;
    the first processor, wherein the first processor receives the filtered signal from the filter, generates the feedback based on the filtered signal, and outputs the feedback to an output device, wherein the feedback indicates how close the transaction object is to the transaction object read interface;
    the output device, wherein the output device outputs the feedback to the user in response to receipt of the feedback from the first processor; and
    a second processor that receives the transaction object information from the transaction object read interface, that generates a processed dataset using the transaction object information, and that outputs the processed dataset, wherein the second processor outputs the processed dataset after the filter outputs the filtered signal.

2. The transaction object reader device of claim 1, wherein the processed dataset includes an encrypted copy of the transaction object information, and wherein the second processor generating the processed dataset includes the second processor encrypting the transaction object information using a cryptographic key.

3. The transaction object reader device of claim 1, wherein the output device includes a visual output device, wherein the feedback indicates how close the transaction object is to the transaction object read interface by outputting a visual representation of a point along a spectrum, wherein the spectrum represents a range of possible distances between the transaction object and the transaction object read interface, wherein the spectrum is one of a color spectrum, a brightness spectrum, a number of lights, or a number of pixels.

4. The transaction object reader device of claim 1, wherein the output device includes an audio output device, wherein the feedback includes audio, wherein a characteristic of the audio changes in response to detection of a change in a distance between the transaction object and the transaction object read interface, wherein the characteristic of the audio is one of audio amplitude or audio frequency.

5. The transaction object reader device of claim 1, wherein the output device includes a vibration actuator, wherein the feedback includes a vibration, wherein a characteristic of the vibration changes in response to detection of a change in a distance between the transaction object and the transaction object read interface, wherein the characteristic of the vibration is one of vibration amplitude or vibration frequency.

6. The transaction object reader device of claim 1, wherein the filter is a low-pass filter.

7. The transaction object reader device of claim 1, wherein the transaction object read interface includes a near field communication (NFC) transceiver, and wherein the transaction object read interface receives the transaction object information via one or more NFC signals sent by the transaction object.

8. The transaction object reader device of claim 1, wherein the transaction object read interface includes a magnetic stripe read head.

9. A method for facilitating a transaction by providing feedback to a user based on proximity of a transaction object to transaction object read interface, the method comprising:
    reading transaction object information from the transaction object via the transaction object read interface in response to physical proximity between the transaction object and the transaction object read interface;
    receiving a reader signal at a filter and from the transaction object read interface;
    outputting a filtered signal from the filter to a first processor in response to receipt of the reader signal, wherein transaction information in the transaction object information is at least partially attenuated out in the filtered signal;
    generating the feedback at the first processor based on the filtered signal, wherein the feedback indicates a degree of proximity between the transaction object and the transaction object read interface;
    outputting the feedback to the user via an output device;
    receiving the transaction object information at a second processor and from the transaction object read interface;
    generating a processed dataset using the second processor and based on the transaction object information; and
    outputting the processed dataset from the second processor after the filter outputs the filtered signal.

10. The method of claim 9, wherein generating the processed dataset using the transaction object information includes encrypting the transaction object information using a first cryptographic key, further comprising:
    sending the processed dataset to a payment processing server via a network communication interface, wherein the payment processing server decrypts the transaction object information via a second cryptographic key and processes the transaction using the transaction object information.

11. The method of claim 9, wherein the transaction object read interface includes a near field communication (NFC) transceiver, and wherein the transaction object read interface receives the transaction object information via one or more NFC signals sent by the transaction object.

12. The transaction object reader device of claim 1, wherein the filtered signal bypasses the second processor.

13. The transaction object reader device of claim 1, wherein the transaction object read interface includes an integrated circuit (IC) chip card reader.

14. The transaction object reader device of claim 1, wherein the output device includes a visual output device, wherein the feedback visually indicates a direction in which the transaction object should be moved in order to approach the transaction object read interface.

15. The transaction object reader device of claim 1, wherein the transaction object read interface includes a plurality of near field communication (NFC) antennae, wherein the feedback indicates a direction, wherein movement of the transaction object in the direction moves the transaction object toward the transaction object read interface, wherein the direction is based on one or more differences in receipt of the transaction object information at each of the plurality of NFC antennae, the one or more differences including at least one of a difference in amplitude or a difference in receipt timing.

16. The transaction object reader device of claim 1, further comprising:
a secure enclosure, wherein the second processor is within the secure enclosure, wherein the secure enclosure includes tamper detection circuitry that is electrically coupled to the second processor, wherein the tamper detection circuitry detects an attempt to tamper with the secure enclosure.

17. The transaction object reader device of claim 16, wherein the filter is within the secure enclosure.

18. The transaction object reader device of claim 1, wherein the first processor wakes up from a low-power-draw state and transitions into a high-power-draw state in response to receipt of the filtered signal from the filter, wherein the first processor receives the filtered signal from the filter via one or more general purpose input/output (GPIO) pins of the first processor.

19. The transaction object reader device of claim 1, further comprising:
a printer that transitions from a deactivated state to an activated state in response to outputting the filtered signal from the filter, wherein the printer prints a receipt while the printer is in the activated state, the receipt corresponding to a transaction processed using the transaction object information.

20. The transaction object reader device of claim 1, wherein the feedback indicates one of a range of possible distances between the transaction object and the transaction object read interface.

* * * * *